US012760247B2

(12) United States Patent
Taljaard et al.

(10) Patent No.: US 12,760,247 B2
(45) Date of Patent: Oct. 13, 2026

(54) COMPOSITIONS TO LIMIT OR ELIMINATE PERCEPTION OF RAW MATERIAL MALODOURS IN SOAP BASES

(71) Applicant: Firmenich SA, Satigny (CH)

(72) Inventors: Innike Taljaard, Midrand (ZA); Resti Magtoto, Plainsboro, NJ (US); Wessel-Jan Kos, Southall (GB)

(73) Assignee: FIRMENICH SA, Satigny (CH)

( * ) Notice: Subject to any disclaimer, the term of this patent is extended or adjusted under 35 U.S.C. 154(b) by 1093 days.

(21) Appl. No.: 17/785,804

(22) PCT Filed: Dec. 3, 2020

(86) PCT No.: PCT/EP2020/084544
§ 371 (c)(1),
(2) Date: Jun. 15, 2022

(87) PCT Pub. No.: WO2021/122045
PCT Pub. Date: Jun. 24, 2021

(65) Prior Publication Data

US 2023/0060897 A1 Mar. 2, 2023

Related U.S. Application Data

(60) Provisional application No. 62/949,149, filed on Dec. 17, 2019.

(30) Foreign Application Priority Data

Mar. 26, 2020 (EP) .................................... 20165947

(51) Int. Cl.
*C11D 3/20* (2006.01)
*C11D 3/50* (2006.01)
(Continued)

(52) U.S. Cl.
CPC .............. *C11D 3/50* (2013.01); *C11D 3/2072* (2013.01); *C11D 9/26* (2013.01); *C11D 9/442* (2013.01)

(58) Field of Classification Search
CPC ....... C11D 3/20; C11D 3/2006; C11D 3/2072; C11D 3/50; C11D 9/00; C11D 9/44; C11D 9/442; C11D 13/10
See application file for complete search history.

(56) References Cited

U.S. PATENT DOCUMENTS 4,304,679 A 12/1981 Hooper et al.
8,133,853 B1 * 3/2012 Yang ...................... A61Q 19/10
510/481
(Continued)

FOREIGN PATENT DOCUMENTS

CN 103269727 8/2013
WO WO-2008154765 A1 * 12/2008 ........... C07C 323/58
(Continued)

OTHER PUBLICATIONS

International Search Report and Written Opinion for corresponding International Application No. PCT/EP2020/084544 dated Feb. 10, 2021 (13 pages).

*Primary Examiner* — Brian P Mruk
(74) *Attorney, Agent, or Firm* — Knobbe, Martens, Olson & Bear, LLP

(57) ABSTRACT

The present disclosure relates to the field of malodour counteraction. More particularly, it concerns compositions that limit, decrease or eliminate the perception of malodours associated with soaps or soap bases. Such compositions include (i) a malodour antagonist system associated with perfuming ingredients performing as malodour counteractant, and (ii) at least one malodour neutralizing system, in a combination that significantly reduces the perception of malodours associated with soaps or soap bases. Such com-
(Continued)

positions, their use in combination with delivery systems and their applications in consumer products are objects of the present disclosure.

2 Claims, 20 Drawing Sheets

(51) Int. Cl.

| | |
|---|---|
| ***C11D 9/00*** | (2006.01) |
| ***C11D 9/26*** | (2006.01) |
| ***C11D 9/44*** | (2006.01) |
| ***C11D 13/10*** | (2006.01) |

(56) References Cited

U.S. PATENT DOCUMENTS

| | | | | |
|---|---|---|---|---|
| 8,772,354 | B2 | 7/2014 | Williams et al. | |
| 8,865,634 | B2 | 10/2014 | Oertling | |
| 2009/0257973 | A1 | 10/2009 | Fraser et al. | |
| 2010/0028288 | A1* | 2/2010 | Tranzeat | A61K 8/40 510/106 |
| 2010/0179088 | A1 | 7/2010 | Flachsmann | |
| 2016/0089318 | A1* | 3/2016 | Cetti | A61K 8/35 514/552 |
| 2017/0266334 | A1 | 9/2017 | Tranzeat et al. | |
| 2019/0343977 | A1* | 11/2019 | Margot | A61L 9/127 |

FOREIGN PATENT DOCUMENTS

| | | |
|---|---|---|
| WO | WO 2018/091686 | 5/2018 |
| WO | WO 2019/101821 | 5/2019 |
| WO | 2019/227019 A1 | 11/2019 |
| WO | WO 2019/227019 | 11/2019 |

* cited by examiner ethylhexyl acetate: earthy, dirty

2-undecanone: oily, waxy

Base 3

2-undecanone: oily, waxy ethylhexyl acetate: earthy, dirty

| | vs. BRAHMANA 1.18% | | | | |
|---|---|---|---|---|---|
| | Will keep my skin free from odours n=60 | Makes me feel fresh and clean n=60 | Will keep my skin healthy n=60 | Will give me a feeling of well-being n=60 | I would use to deep cleanse and purify my skin n=60 |
| BASE | — 3.3 | — 3.3 | — 3.3 | — 3.3 | — 3.3 |
| Base + NM 0.02% | — 3.4 | — 3.5 | — 3.5 | — 3.4 | — 3.5 |
| BRAHMANA 1.03% + NM 0.02% | 4.5 | 4.6 | 4.5 | 4.6 | 4.5 |
| BRAHMANA 1.18% + NM 0.02% | 4.6 | 4.7 | 4.6 | 4.6 | 4.6 |
| BRAHMANA 1.14% + NM 0.02% | 4.4 | 4.4 | 4.3 | 4.4 | 4.4 |
| BRAHMANA 1.18% | 4.4 | 4.4 | 4.3 | 4.4 | 4.4 |

| | vs. CITRAS 0.56% | | | | |
|---|---|---|---|---|---|
| | Will keep my skin free from odours n=60 | Makes me feel fresh and clean n=60 | Will keep my skin healthy n=60 | Will give me a feeling of well-being n=60 | I would use to deep cleanse and purify my skin n=60 |
| BASE | — 3.1 | — 3.2 | — 3.2 | — 3.2 | — 3.2 |
| BASE + NM 0.01% | — 3.6 | — 3.7 | — 3.7 | — 3.6 | — 3.7 |
| CITRAS 0.56% | 4.5 | 4.6 | 4.4 | 4.5 | 4.4 |
| CITRAS 0.56% + NM0.01% | 4.4 | 4.5 | 4.4 | 4.4 | 4.5 |
| CITRAS 0.49% + NM0.01% | 4.4 | 4.4 | 4.3 | 4.4 | 4.4 |
| CITRAS 0.54% + NM0.01% | 4.3 | 4.4 | 4.4 | 4.4 | 4.4 |

Figure 17.

| | vs. BRAHMANA 1.18% | | | | |
|---|---|---|---|---|---|
| | Will keep my skin free from odours n=60 | Makes me feel fresh and clean n=60 | Will keep my skin healthy n=60 | Will give me a feeling of well-being n=60 | I would use to deep cleanse and purify my skin n=60 |
| BASE | — 3.4 | — 3.5 | — 3.5 | — 3.5 | — 3.5 |
| Base + NM 0.02% | — 3.4 | — 3.4 | — 3.5 | — 3.4 | — 3.6 |
| BRAHMANA 1.03% + NM 0.02% | 4.4 | 4.4 | 4.4 | 4.4 | 4.5 |
| BRAHMANA 1.18% + NM 0.02% | 4.4 | 4.4 | 4.3 | 4.3 | 4.3 |
| BRAHMANA 1.14% + NM 0.02% | 4.5 | 4.5 | 4.5 | 4.5 | 4.5 |
| BRAHMANA 1.18% | 4.4 | 4.4 | 4.4 | 4.4 | 4.4 |

| | vs. CITRAS 0.56% | | | | |
|---|---|---|---|---|---|
| | Will keep my skin free from odours n=60 | Makes me feel fresh and clean n=60 | Will keep my skin healthy n=60 | Will give me a feeling of well-being n=60 | I would use to deep cleanse and purify my skin n=60 |
| BASE | — 3.2 | — 3.2 | — 3.2 | — 3.2 | — 3.1 |
| BASE + NM 0.01% | — 3.3 | — 3.3 | — 3.3 | — 3.3 | — 3.4 |
| CITRAS 0.56% | 4.6 | 4.6 | 4.5 | 4.6 | 4.5 |
| CITRAS 0.56% + NM0.01% | 4.4 | 4.4 | 4.4 | 4.4 | 4.4 |
| CITRAS 0.49% + NM0.01% | 4.5 | 4.6 | 4.5 | 4.5 | 4.6 |
| CITRAS 0.54% + NM0.01% | 4.3 | 4.3 | 4.3 | 4.4 | 4.3 |

Figure 18.

| | vs. BRAHMANA 1.18% | | | | |
|---|---|---|---|---|---|
| | Will keep my skin free from odours n=60 | Makes me feel fresh and clean n=60 | Will keep my skin healthy n=60 | Will give me a feeling of well-being n=60 | I would use to deep cleanse and purify my skin n=60 |
| BASE | — 3.2 | — 3.4 | — 3.4 | — 3.3 | — 3.2 |
| Base + NM 0.02% | — 3.1 | — 3.0 | — 3.0 | — 3.1 | — 3.1 |
| BRAHMANA 1.03% + NM 0.02% | 4.1 | 4.2 | 4.2 | 4.1 | 4.1 |
| BRAHMANA 1.18% + NM 0.02% | 4.5 | 4.5 | 4.5 | 4.5 | 4.5 |
| BRAHMANA 1.14% + NM 0.02% | 4.2 | 4.4 | 4.2 | 4.3 | 4.3 |
| BRAHMANA 1.18% | 4.4 | 4.5 | 4.3 | 4.4 | 4.4 |

| | vs. CITRAS 0.56% | | | | |
|---|---|---|---|---|---|
| | Will keep my skin free from odours n=60 | Makes me feel fresh and clean n=60 | Will keep my skin healthy n=60 | Will give me a feeling of well-being n=60 | I would use to deep cleanse and purify my skin n=60 |
| BASE | — 3.4 | — 3.4 | — 3.3 | — 3.4 | — 3.4 |
| BASE + NM 0.01% | — 3.1 | — 3.3 | — 3.3 | — 3.2 | — 3.3 |
| CITRAS 0.56% | 4.2 | 4.3 | 4.3 | 4.3 | 4.3 |
| CITRAS 0.56% + NM0.01% | 4.1 | 4.1 | 4.0 | 4.0 | 4.0 |
| CITRAS 0.49% + NM0.01% | 4.5 | 4.4 | 4.4 | 4.5 | 4.5 |
| CITRAS 0.54% + NM0.01% | 4.4 | 4.4 | 4.4 | 4.3 | 4.4 |

Figure 19.

COMPOSITIONS TO LIMIT OR ELIMINATE PERCEPTION OF RAW MATERIAL MALODOURS IN SOAP BASES

This present application is a U.S. national phase entry under 35 U.S.C. § 371 of PCT Application No. PCT/EP2020/084544, filed Dec. 3, 2020, which claims priority to U.S. Patent Application No. 62/949,149, filed Dec. 17, 2019, and European Patent Application No. 20165947.1, filed Mar. 26, 2020. The entire contents of these applications are explicitly incorporated herein by this reference.

FIELD OF THE INVENTION

The present disclosure relates to the field of malodour counteraction. More particularly, it concerns the use of compositions to limit, decrease or eliminate the perception of malodours associated with soaps or soap bases. Such compositions include (i) a malodour antagonist system associated with perfuming ingredients performing as malodour counteractant, and (ii) at least one malodour neutralizing system, in a combination that significantly reduces the perception of malodours associated with soaps or soap bases. Such compositions, their use in combination with delivery systems and their applications in consumer products are objects of the present disclosure.

BACKGROUND

Smells perceived as malodourous exist in many environments and are experienced in our daily life. Malodours are usually complex mixtures of more than one malodourant compound which may typically include various amines, thiols, sulfides, short chain aliphatic and unsaturated acids, e.g. fatty acids, and their derivatives.

Some soaps may contain raw materials having malodours, such as, for example animal tallow and/or vegetable oils, forming the base of the soap. Such soaps may be used in laundry bars, skin/body cleansing bars, and the like. Frequently, soaps contain fragrance materials, to (i) impart a pleasant smell for the consumer, and (ii) mask the raw materials having malodours. Fragrance materials however are expensive.

Malodours are not pleasant for humans and therefore there is a constant need for malodour counteracting technologies (MOC) for decreasing or suppressing the perception of malodours. However the task is generally very difficult because the chemicals responsible for the malodour elicit extremely powerful smells and can have much lower detection thresholds than the odourants/perfuming compositions typically used to mask them. Therefore one has to use excessive amounts of odourants/perfuming compositions to achieve an acceptable masking of the malodour.

Therefore, there remains a need for a soap bar having a reduced malodour that is perceived by a consumer. The present disclosure provides a solution to the above mentioned problem by providing (i) a malodour antagonist system associated with perfuming ingredients performing as malodour counteractant, and (ii) at least one malodour neutralizing system, in a combination that significantly reduces the perception of malodours associated with soaps.

SUMMARY

In one aspect, the present disclosure provides a method, wherein the method reduces the amount of a fragrance composition effective to limit, decrease or eliminate the perception of a raw material malodour by a consumer of a soap base, wherein the method comprises adding to the soap base, in an amount effective to limit, decrease or eliminate the perception of the raw material malodour of the soap base, a malodour counteracting composition comprising (i) a malodour antagonist system associated with perfuming ingredients performing as malodour counteractant, and (ii) at least one malodour neutralizing system, wherein the amount effective to limit, decrease or eliminate the perception of the raw material malodour of the soap base is from 0.005 to 0.1 wt %, relative to the soap base.

In one aspect, the method reduces the amount of a fragrance composition effective to limit, decrease or eliminate the perception of the raw material malodour of a soap base from 1 to 50%.

In one aspect, the present disclosure provides a malodour counteracting composition comprising:

(i) a malodour antagonist system associated with perfuming ingredients performing as malodour counteractant; and (ii) at least one malodour neutralizing system.

In one aspect, the malodour counteracting composition further comprises at least one perfuming raw material that limits, decreases or eliminates the perception of ammonia-based odourants.

In one aspect, the malodour antagonist system is present in the malodour counteracting composition in an amount from 30 to 50% wt %, relative to the malodour counteracting composition.

In one aspect, the malodour antagonist system comprises at least one compound that inhibits the activity of at least one olfactory receptor selected from the group consisting of: a DMTS olfactory receptor, an indole/skatole olfactory receptor, a butyric acid olfactory receptor, and a p-cresol olfactory receptor.

In one aspect, the inhibition of the at least one olfactory receptor inhibits, reduces, or suppresses, the perception of a raw material malodour by a consumer.

In one aspect, the at least one compound that inhibits the activity of at least one olfactory receptor is selected from the group consisting of: benzyl acetate, isobornyl acetate, undec-10-enal, undec-9-enal, Virginia cedarwood essential oil, 3,7-dimethyl-2,6-octadienal, 3,7-Dimethyl-6-octen-1-ol, 3,7-dimethyloct-6-enenitrile, coumarin, delta damascone, methyl ionone gamma, (Z)-3,4,5,6,6-pentamethylhept-3-en-2-one, 2,6-dimethylhept-5-enal, menthone, 1-(5,5-dimethyl-1-cyclohexenyl)pent-4-en-1-one, patchouli essential oil, 2,6-nonadienal, (2-tert-butylcyclohexyl) acetate, vertoxime, and 2-Methoxynaphthalene.

In one aspect, the at least one malodour neutralizing system is present in the malodour counteracting composition in an amount from 5 to 20% wt %, relative to the malodour counteracting composition.

In one aspect, the at least one malodour neutralizing system is selected from the group consisting of: a) a composition comprising at least one ingredient selected from the group consisting of: (i) at least one aldehyde of formula $R^1CHO$, wherein $R^1$ is an aliphatic linear or branched, saturated or unsaturated carbon chain containing from 1 to 12 carbon atoms; (ii) at least one ketone of formula $R^2COR^3$, wherein $R^2$ is an ethyl or methyl group and $R^3$ is an aliphatic linear or branched, saturated or unsaturated carbon chain containing from 1 to 12 carbon atoms; and (iii)

primary alcohols of formula $R^4CH_2OH$, wherein $R^4$ is an aliphatic linear or branched, saturated or unsaturated carbon chain containing 1 to 12 carbon atoms, optionally substituted with an aromatic moiety; b) a composition comprising: (i) at least one ingredient selected from the group consisting of α-damascone, β-damascone, γ-damascone, δ-damascone, α-neobutenone, (+−)-methyl-2,2-dimethyl-6-methylene-1-cyclohexanecarboxylate, α- or β-(E)-4-(2,6,6-trimethyl-2-cyclohexen-1-yl)-3-buten-2-one (α- or β-ionone), α-methyl-ionone, β-methyl-ionone, γ-methyl-ionone, 1-(2,6,6-trimethyl-1(2)-cyclohexen-1-yl)-1,6-heptadien-3-one and 1-(4,6,6-trimethyl-1,3-cyclohexadien-1-yl)-2-buten-1-one; and (ii) at least one nitrile ingredient selected from the group consisting of 3-phenyl-2-propenenitrile, citronitrile, citronellyl nitrile, 2-propyl-1-heptanenitrile, dodecanenitrile, and the mixture of 3-(2,3-dimethyl-2(3)-cyclopenten-1-yl)butanenitrile and 3-(2-methyl-3-methylene-1-cyclopentyl)butanenitrile; and c) a combination of a) and b).

In one aspect, at least one perfuming raw material that limits, decreases or eliminates the perception of ammonia-based odourants is present in the malodour counteracting composition in an amount from 0.01 to 20% wt %, relative to the malodour counteracting composition.

In one aspect, at least one perfuming raw material that limits, decreases or eliminates the perception of ammonia-based odourants is selected from the group consisting of: benzyl acetate, terpinyl acetate, acetophenone, undec-10-enal, hendecanal, undec-9-enal, methyl anthranilate, (5R)-2-methyl-5-prop-1-en-2-ylcyclohex-2-en-1-one, Virginia cedarwood essential oil, 1,5,5,9-tetramethyl-13-oxatricyclo (8.3.0.0.(4.9))tridecane, 3,7-dimethyl-2,6-octadienal, 3,7-Dimethyl-6-octen-1-ol, 3,7-dimethyloct-6-enenitrile, 3a,4,5,6,7,7a-hexahydro-4,7-methanoinden-6-yl acetate, delta damascone, diphenyloxide, ethyl vanillin, clove leaf essential oil, methyl ionone gamma, (Z)-3,4,5,6,6-pentamethylhept-3-en-2-one, 2,6-dimethylhept-5-enal, menthone, patchouli essential oil, pipol, TBCH, (2-tert-butylcyclohexyl) acetate, methyl cedryl ketone, 2-Methoxynaphthalene, and cineole.

In one aspect, the present disclosure provides a perfuming composition comprising a malodour counteracting composition according to an aspect presented herein.

In one aspect, the present disclosure provides a soap comprising a malodour counteracting composition according to an aspect presented herein.

In a further aspect, the present invention provides a consumer product comprising a malodour composition of the present invention.

The consumer product may be, for example:

- a perfume, such as a fine perfume, an Eau de Toilette, a cologne or an after-shave lotion;
- a fabric care product, such as a liquid detergent, a powder detergent, detergent tablets, a detergent bar, a detergent paste, a detergent pouch, a liquid fabric softener, fabric softener sheets, a fabric scent booster, a laundry pre-treatment, a fabric refresher, an ironing water, a laundry bleach, a carpet powder or a carpet cleaner;
- a hair care product, such as a shampoo, a hair conditioner, a hair cream, a hair oil, a hair styling product (such as a spray, mousse or gel), a hair coloration product or a hair permanent wave product;
- a skin care product, such as a face cream, a face lotion, a shaving product (such as a foam, cream, gel or oil), a body and/or hand product (such as a lotion, cream, gel or oil), a skin firming product, a depilatory, a talcum powder, a foot care cream or lotion, baby wipes, cleansing wipes, moisturizer wipes, a sun-protection product (such as a spray, lotion, cream or oil), an after-sun lotion, or a self-tanning product;
- a body deodorant or antiperspirant product, such as a body deodorant spray, a roll-on deodorant, a deodorant stick, a deodorant cream, an antiperspirant spray, an antiperspirant stick, a roll-on antiperspirant liquid, an antiperspirant stick, or an antiperspirant cream;
- a skin-cleansing product, such as a soap bar, a shower gel, a liquid hand soap, a bath foam or an intimate wash product;
- an air freshening product, such as an air freshener spray, a gel air freshener, a liquid-wick air freshener, a solid air freshener comprising a porous substrate (such as a paper or card blotter, a porous ceramic, or a porous plastic), a liquid or gel air freshener comprising a permeable membrane, an electrically operated air freshener, and a dual purpose air freshener/disinfectant spray; and/or
- a surface care product, such as an all-purpose cleaner, a furniture polish, a wood floor cleaner, a window cleaner, a hand dishwashing product (such as a liquid, gel or paste), a machine dishwashing product (such as a powder, liquid, gel, tablet or sachet), a toilet bowl cleaning liquid, an in-cistern toilet cleaner, a toilet rim block, or a toilet rim liquid; a pet-litter.

BRIEF DESCRIPTION OF THE FIGURES

While the specification concludes with claims particularly pointing out and distinctly claiming the invention, it is believed that the invention will be better understood from the following description of the accompanying figures wherein:

FIG. 17 shows the fragrance benefit of the neat test bases described in the second study set forth in Example 3, compared to the unfragranced benchmark base.

FIG. 18 shows the fragrance benefit of the wet test bases described in the second study set forth in Example 3, compared to the unfragranced benchmark base.

FIG. 19 shows the fragrance benefit of the dry test bases described in the second study set forth in Example 3, compared to the unfragranced benchmark base.

DETAILED DESCRIPTION

Figure 1:
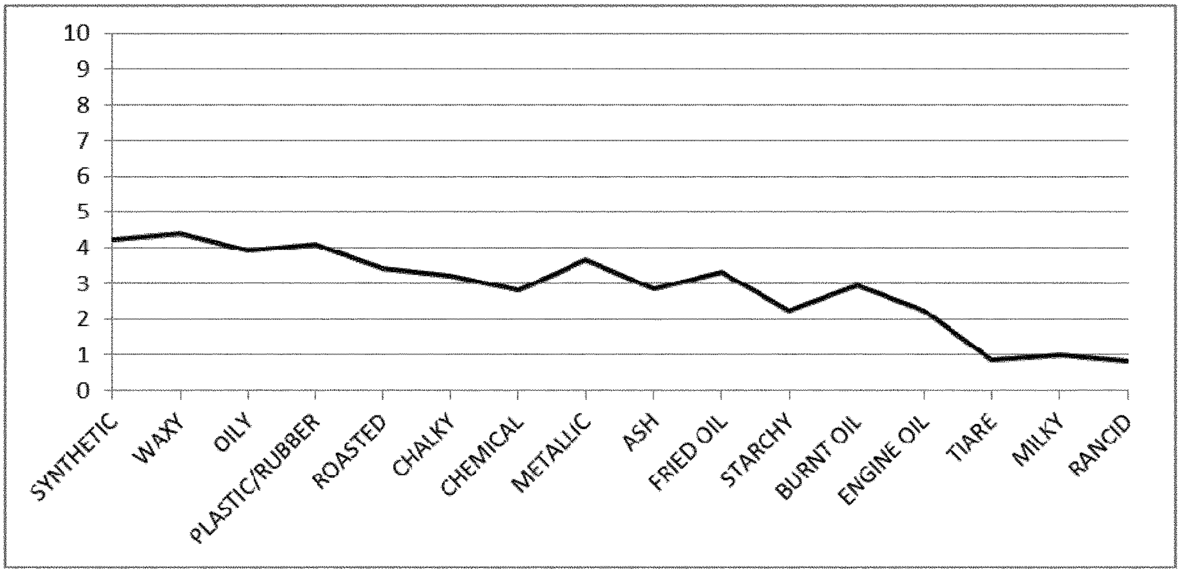
FIG. 1 shows the sensory profile of a first representative laundry soap base, determined using the QDA method described in Example 1.
Figure 2:
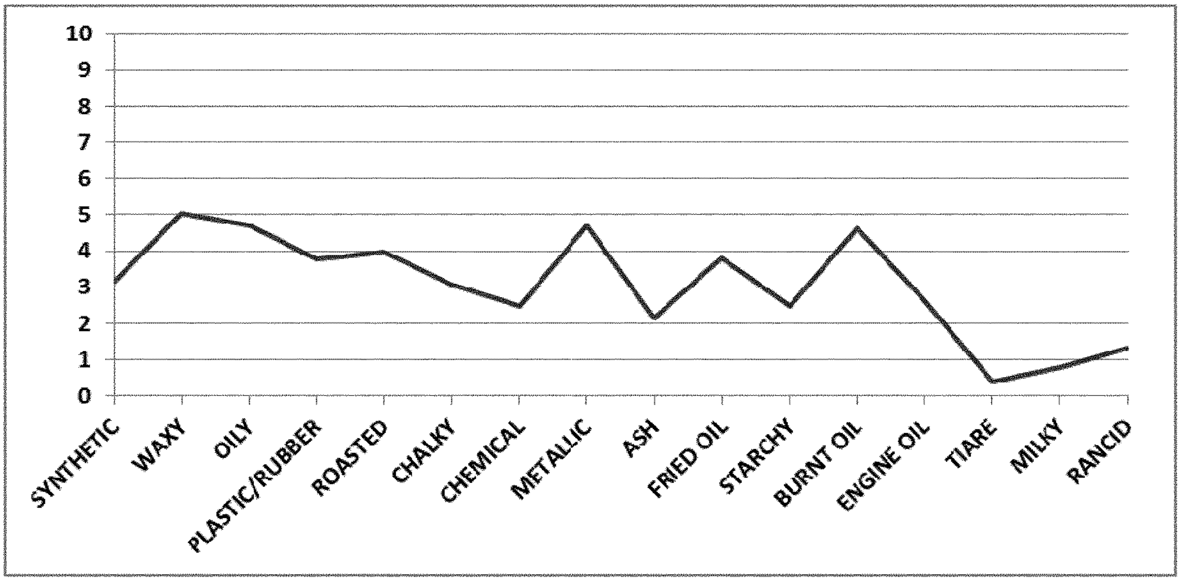
FIG. 2 shows the sensory profile of a second representative laundry soap base, determined using the QDA method described in Example 1.
Figure 3:
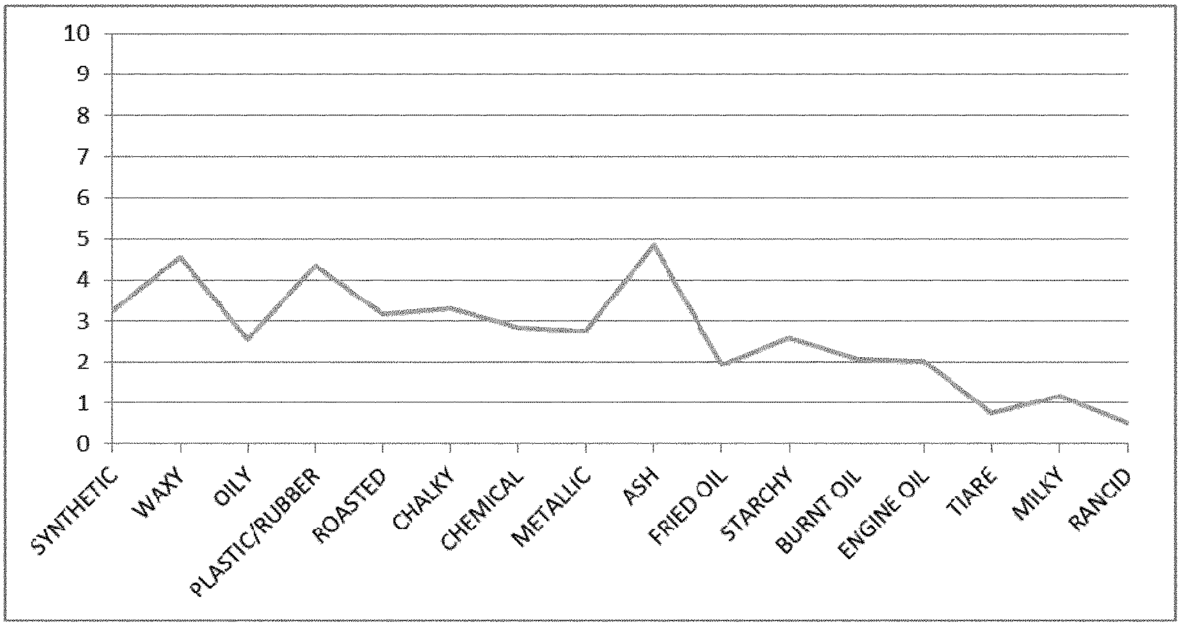
FIG. 3 shows the sensory profile of a third representative laundry soap base, determined using the QDA method described in Example 1.
Figure 4:
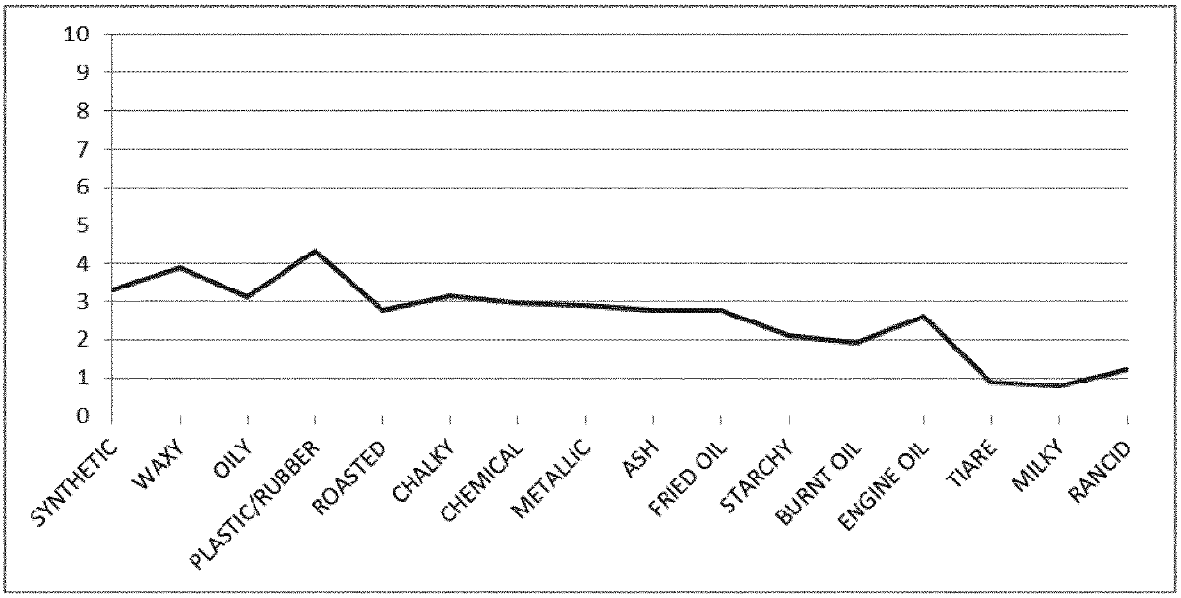
FIG. 4 shows the sensory profile of a fourth representative laundry soap base, determined using the QDA method described in Example 1.
Figure 5:
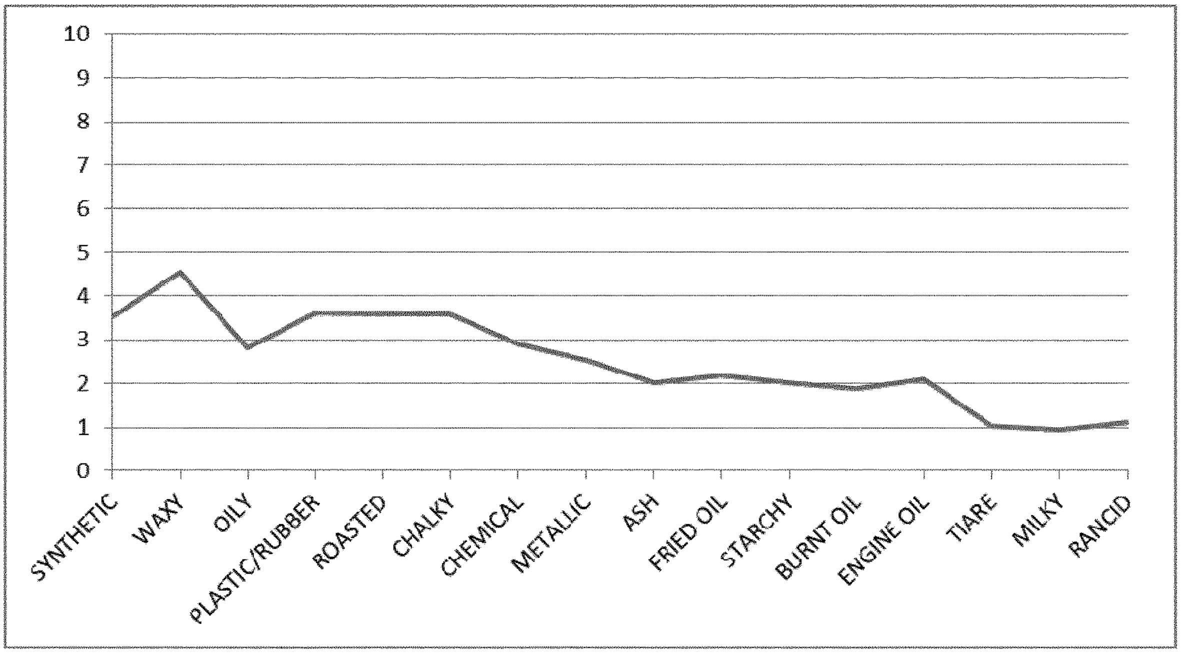
FIG. 5 shows the sensory profile of a fifth representative laundry soap base, determined using the QDA method described in Example 1.
Figure 6:
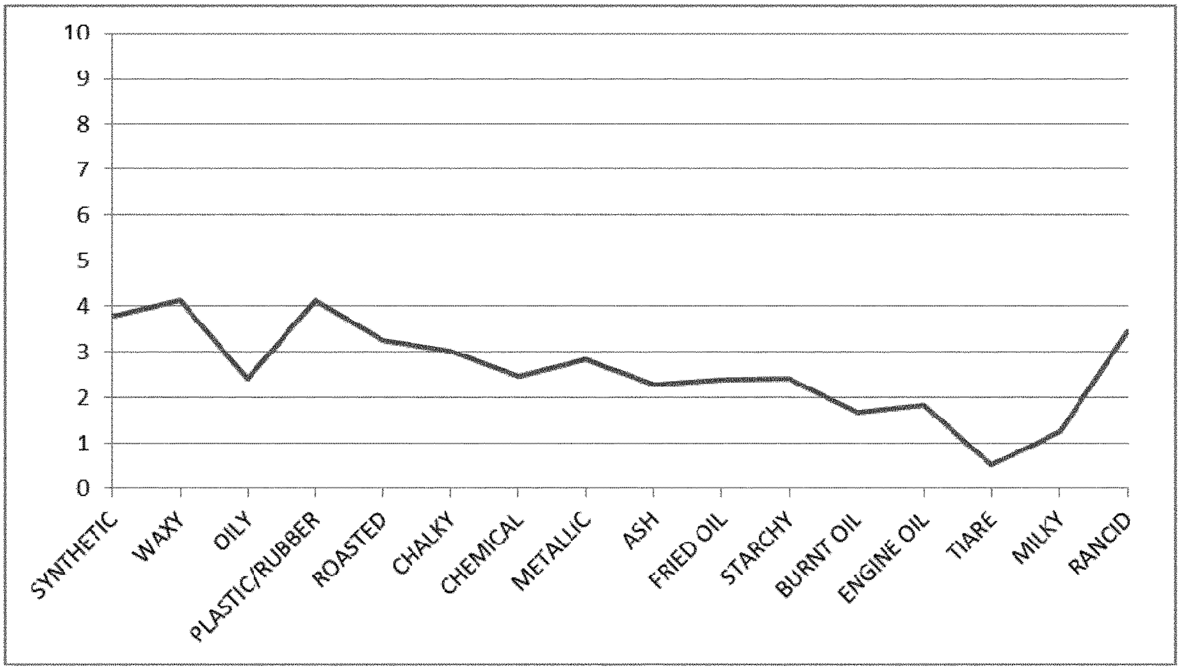
FIG. 6 shows the sensory profile of a sixth representative laundry soap base, determined using the QDA method described in Example 1.
Figure 7:
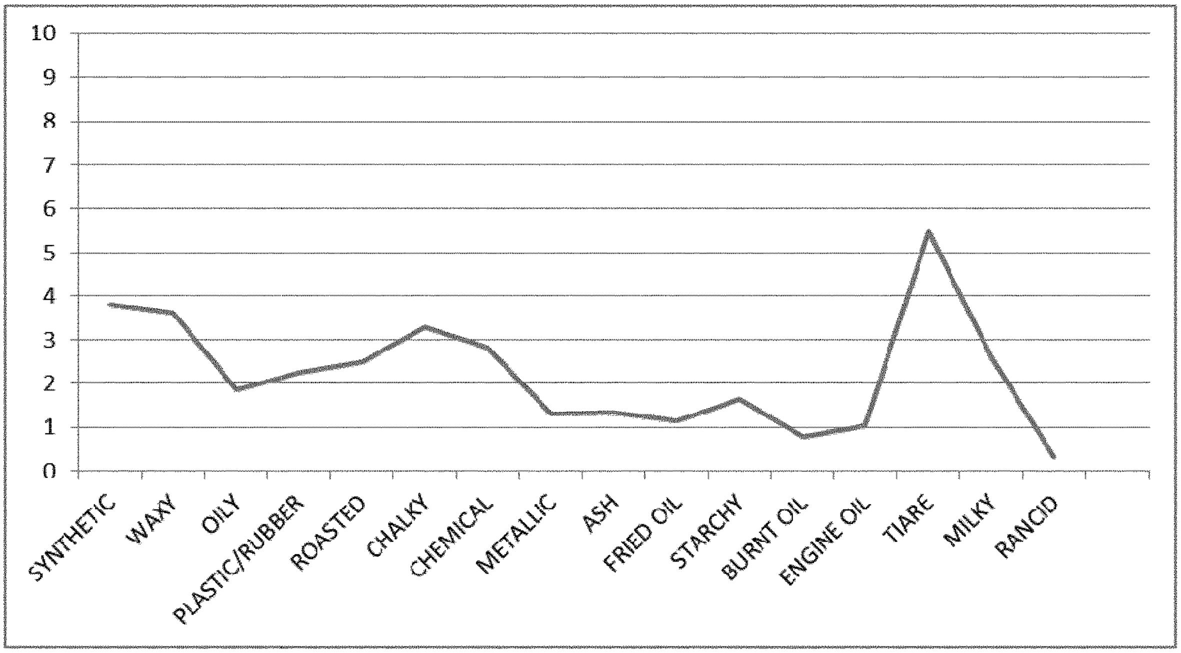
FIG. 7 shows the sensory profile of a seventh representative laundry soap base, determined using the QDA method described in Example 1.

In the following description, reference is made to specific embodiments which may be practiced, which is shown by way of illustration. These embodiments are described in detail to enable those skilled in the art to practice the invention described herein, and it is to be understood that other embodiments may be utilized and that logical changes may be made without departing from the scope of the aspects presented herein. The following description of example embodiments is, therefore, not to be taken in a limited sense, and the scope of the various aspects presented herein is defined by the appended claims.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

Smells perceived as malodourous exist in many environments and are experienced in our daily life. Malodours are usually complex mixtures of more than one malodourant compound which may typically include various amines, thiols, sulfides, short chain aliphatic and unsaturated acids, e.g. fatty acids, and their derivatives.

Some soaps may contain raw materials having malodours, such as, for example animal tallow and/or vegetable oils, forming the base of the soap. Such soaps may be used in laundry bars, skin/body cleansing bars, and the like. Frequently, soaps contain fragrance materials, to (i) impart a pleasant smell for the consumer, and (ii) mask the raw materials having malodours. Fragrance materials however are expensive.

Therefore, there remains a need for a soap bar having a reduced malodour that is perceived by the consumer. The present disclosure provides a solution to the above mentioned problem by providing (i) a malodour antagonist system associated with perfuming ingredients performing as malodour counteractant, and (ii) at least one malodour neutralizing compound, in a combination that significantly reduces the perception of malodours associated with soaps.

Without intending to be limited to any particular theory, and referring to Example 1 below, consumers in emerging markets, such as, for example, sub-Saharan Africa frequently perceive raw material malodours in consumer products containing certain raw materials, such as animal tallow and/or vegetable oils. Such raw materials frequently form the base of a consumer product, such as a laundry bar. As used herein, the term "base" refers to a base, which is distinct from, but compatible with, compositions presented herein, and which is typically formed of substances capable of achieving the functional effect typically required from that product such as cleaning, softening, freshening, deodourizing and others. Typical consumer product bases are the functional mixtures of ingredients that form the base of for example a surface or textile detergent or soap, a surface or textile softener, an air freshener, a cosmetic preparation, a deodorant, etc.

The perceived raw material malodours may be characterized as at least one malodour selected from the group consisting of: tiare, synthetic, milky, waxy, burnt oil, metallic, oily, fried oil, roasted, chalky, plastic, rubber, starchy, engine oil, and chemical. One of ordinary skill in the art may recognize that the list of malodour characteristics is not exhaustive.

In one aspect, the perceived raw material malodour is at least one malodour selected from the group consisting of: tiare, synthetic, and milky.

In one aspect, the perceived raw material malodour is at least one malodour selected from the group consisting of: waxy, burnt oil, and metallic.

In one aspect, the perceived raw material malodour is at least one malodour selected from the group consisting of: waxy, oily, fried oil, roasted, chalky, plastic/rubber, starchy, engine oil, chemical and synthetic.

The perceived malodour raw material may be masked, in part, by increasing the amount of perfuming composition to the consumer product containing the certain raw materials. However, increasing the amount of a perfuming composition to mask the perceived raw material malodour may not be cost effective.

The compositions of the present disclosure are capable of limiting, decreasing or eliminating the perception of raw material malodour by a consumer, thereby reducing the amount of the perfuming composition that is added to the consumer product to mask the raw material malodour perceived by the consumer.

Accordingly, in one aspect, the present disclosure provides a method, wherein the method reduces the amount of a fragrance composition effective to limit, decrease or eliminate the perception of a raw material malodour by a consumer of a soap base, wherein the method comprises adding to the soap base, in an amount effective to limit, decrease or eliminate the perception of the raw material malodour of the soap base, a malodour counteracting composition comprising (i) a malodour antagonist system associated with perfuming ingredients performing as malodour counteractant, and (ii) at least one malodour neutralizing system, wherein the amount effective to limit, decrease or eliminate the perception of the raw material malodour of the soap base is from 0.005 to 0.1 wt %, relative to the soap base.

In one aspect, the method reduces the amount of a fragrance composition effective to limit, decrease or eliminate the perception of the raw material malodour of a soap base from 1 to 50%.

As used herein, the term "fragrance composition" is used to mean a mixture of at least one, alternatively, at least two perfuming ingredients. Moreover, by "perfuming ingredient" it is meant here a compound, which can be used in a perfuming preparation or a composition to impart at least an hedonic effect. In other words such an ingredient, to be considered as being a perfuming one, must be recognized by a person skilled in the art of perfumery as being able to impart or modify in a positive or pleasant way the odour of a composition, and not just as having an odour.

The nature and type of the perfuming ingredients do not warrant a more detailed description here, which in any case would not be exhaustive, the skilled person being able to select them on the basis of their general knowledge and according to intended use or application and the desired organoleptic effect. In general terms, these perfuming ingredients belong to chemical classes as varied as alcohols, lactones, aldehydes, ketones, esters, ethers, acetates, nitriles, terpenoids, nitrogenous or sulphurous heterocyclic compounds and essential oils, and the perfuming co-ingredients can be of natural or synthetic origin.

In particular one may cite perfuming ingredients which are commonly used in perfume formulations, such as:

Aldehydic ingredients: decanal, dodecanal, 2-methyl-undecanal, 10-undecenal, octanal and/or nonenal;

Aromatic-herbal ingredients: eucalyptus oil, camphor, eucalyptol, menthol and/or alpha-pinene;

Balsamic ingredients: coumarine, ethylvanillin and/or vanillin;

Citrus ingredients: dihydromyrcenol, 3,7-dimethylocta-2,6-dienal, orange oil, linalyl acetate, (−)-(R)-3,7-dimethyl-6-octenenitrile, orange terpenes, limonene, 1-P-menthen-8-yl acetate and/or 1,4(8)-P-menthadiene;

Floral ingredients: Methyl dihydrojasmonate, linalool, Citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4(2H)-pyranol, beta ionone, methyl 2-(methylamino)benzoate, (E)-3-methyl-4-(2,6 ,6-trimethyl-2-cyclohexen -1-yl)-3-buten-2-one, hexyl salicylate, 3,7-dimethyl-1,6-nonadien-3-ol, 3-(4-isopropylphenyl)-2-methylpropanal, verdyl acetate, geraniol, P-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-P-menthanol, Propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 4-phenyl-2-butanone, isononyle acetate, 4-(1,1-diméthyléthyl)-1-cyclohexyl acetate, verdyl isobutyrate and/or mixture of methylionones isomers;

Fruity ingredients: gamma undecalactone, 4-decanolide, ethyl 2-methyl-pentanoate, hexyl acetate, ethyl 2-methylbutanoate, gamma nonalactone, allyl heptanoate, 2-phenoxyethyl isobutyrate, ethyl 2-methyl-1,3-dioxolane-2-acetate and/or diethyl 1,4-cyclohexane dicarboxylate;

Green ingredients: 2,4-Dimethyl-3-cyclohexene-1-carbaldehyde, 2-tert-butyl-1-cyclohexyl acetate, (+-)-1-phenylethyl acetate, allyl (2-methylbutoxy)acetate, 4-methyl-3-decen-5-ol, diphenyl ether, (Z)-3-hexen-1-ol and/or 1-(5,5-dimethyl-1 -cyclohexen-1-yl)-4-penten-1-one;

Musk ingredients: 1,4-dioxa-5,17-cycloheptadecane-dione, pentadecenolide, 3-Methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, pentadecanolide and/or (1S,1'R)-[1-(3',3'-Dimethyl-1'-cyclohexyl)ethoxycarbonyl]methyl propanoate;

Woody ingredients: 1-(octahydro-2,3,8,8-tetramethyl-2-naphtalenyl)-1-ethanone, patchouli oil, terpenes fractions of patchouli oil, (1'R,E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, Methyl cedryl ketone, 5-(2,2,3-trimethyl-3-cyclopentenyl)-3-methylpentan-2-ol, 1-(2,3,8,8-tetramethyl-1,2,3,4,6,7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b] furan and any of its stereoisomers, heliotropin, anisic aldehyde, eugenol, cinnamic aldehyde, clove oil, 3-(1,3-benzodioxol-5-yl)-2-methylpropanal and/or 3-(3-isopropyl-1-phenyl)butanal.

Perfuming ingredients may not be limited to the above mentioned, and many other of these ingredients are in any case listed in reference texts such as the book by S. Arctander, Perfume and Flavor Chemicals, 1969, Montclair, New Jersey, USA, or its more recent versions, or in other works of a similar nature, as well as in the patent literature in the field of perfumery. It is also understood that co-ingredients may also be compounds known to release in a controlled manner various types of perfuming compounds.

The Malodour Counteracting Composition

In one aspect, the present disclosure provides a malodour counteracting composition comprising:

(i) a malodour antagonist system associated with perfuming ingredients performing as malodour counteractant; and (ii) at least one malodour neutralizing system.

In one aspect, the malodour counteracting composition further comprises at least one perfuming raw material that limits, decreases or eliminates the perception of ammonia-based odourants.

The malodour antagonist system: Without intending to be limited to any particular theory, malodours are usually complex mixtures of more than one malodourant compound which may typically include various amines, thiols, sulfides, short chain aliphatic and unsaturated acids, e.g. fatty acids, and their derivatives. In one aspect, the perceived raw material malodours may be due to various chemical compounds, such as dimethyl trisulfide (DMTS), butyric acid, indole, and p-cresol.

In one aspect, the raw material malodour may activate at least one olfactory receptor selected from the group consisting of: a DMTS olfactory receptor, an indole/skatole olfactory receptor, a butyric acid olfactory receptor, and a p-cresol olfactory receptor. In one aspect, the malodour antagonist system comprises at least one compound that inhibits the activity of at least one olfactory receptor selected from the group consisting of: a DMTS olfactory receptor, an indole/skatole olfactory receptor, a butyric acid olfactory receptor, and a p-cresol olfactory receptor. In one aspect, the at least one olfactory receptor is an olfactory receptor disclosed in International Patent Application Publication No. WO2019/101821 A1. In an alternate aspect, the at least one olfactory receptor is an olfactory receptor disclosed in International Patent Application Publication No. WO2018/091686 A1.

In one aspect, the inhibition of the at least one olfactory receptor inhibits, reduces, or suppresses, the perception of a raw material malodour by a consumer.

As used herein, the terms "antagonists," "inhibitor," "blockers," "suppressors," "counteractants" and "modulators" of olfactory receptors are used interchangeably to refer to inhibitory, blocking, suppressing, or modulating molecules identified using in vivo, ex vivo and in vitro assays for olfactory transduction, e.g., ligands, antagonists, and their homologs and mimetics. Inhibitors are compounds that, e.g., bind to, partially or totally block stimulation, decrease, suppress, prevent, delay activation, inactivate, desensitize, or down regulate olfactory transduction, e.g., antagonists. Activators are compounds that, e.g., bind to, stimulate, increase, open activate, facilitate, enhance activation, sensitize, or up regulate olfactory transduction, e.g., agonists. Modulators include compounds that, e.g., alter the interaction of a receptor with: extracellular proteins that bind activators or inhibitor (e.g., odourant-binding proteins, ebnerin and other members of the hydrophobic carrier family); G proteins; kinases (e.g., homologs of rhodopsin kinase and beta adrenergic receptor kinases that are involved in deactivation and desensitization of a receptor); and arrestins, which also deactivate and desensitize receptors.

The ability of compounds of the present disclosure to inhibit or antagonize the at least one olfactory receptor may be determined by any suitable method readily selected by one of ordinary skill in the art, such as, for example, via an ex vivo cultured neuron assay, or via an in vitro assay using a cell line that expresses a butyric acid olfactory receptor.

Such assays for inhibitors and activators include, e.g., expressing OR family members in cells or cell membranes, applying putative modulator compounds, in the presence or absence of malodour molecules, e.g. butyric acid, and then determining the functional effects on olfactory transduction, as described in the Examples below. Samples or assays comprising OR family members that are treated with a potential inhibitor are compared to control samples without the inhibitor to examine the extent of inhibition. Control samples (untreated with inhibitors, but treated with the malodour) are assigned a relative maximal OR activity value of 100%. Inhibition of an OR is achieved when the normalized OR activity value relative to the control is about 80%, optionally 50% or 25-0%. Alternatively, in some aspects, inhibition of an OR is achieved if the $IC_{50}$ value of the antagonist compound is equal to or less than 1500 μM. Alternatively, in some aspects, inhibition of an OR is achieved if the $IC_{50}$ value of the antagonist compound is equal to or less than 200 μM. Alternatively, in some aspects, inhibition of an OR is achieved if the $IC_{50}$ value of the antagonist compound is equal to or less than 20 μM.

As used herein, the term "olfactory receptor", or "OR" refers to one or more members of a family of G protein-coupled receptors (GPCRs) that are expressed in olfactory cells. Olfactory receptor cells can also be identified on the basis of morphology or by the expression of proteins specifically expressed in olfactory cells. OR family members may have the ability to act as receptors for odourants and induce an olfactory transduction cascade.

In one aspect, the at least one compound that inhibits the activity of at least one olfactory receptor is selected from the group consisting of: benzyl acetate, isobornyl acetate, undec-10-enal, undec-9-enal, Virginia cedarwood essential oil, 3,7-dimethyl-2,6-octadienal, 3,7-Dimethyl-6-octen-1-ol, 3,7-dimethyloct-6-enenitrile, coumarin, delta damascone, methyl ionone gamma, (Z)-3,4,5,6,6-pentamethylhept-3-en-2-one, 2,6-dimethylhept-5-enal, menthone, 1-(5,5-dimethyl-1-cyclohexenyl)pent-4-en-1-one, patchouli essential oil, 2,6-nonadienal, (2-tert-butylcyclohexyl) acetate, vertoxime, and 2-Methoxynaphthalene.

Examples of other compounds capable of inhibiting the activity of at least one olfactory receptor selected from the group consisting of: a DMTS olfactory receptor, an indole/skatole olfactory receptor, a butyric acid olfactory receptor, and a p-cresol olfactory receptor include the compounds disclosed in International Patent Application Publication No. WO2019/101821 A1.

Additional examples of other compounds capable of inhibiting the activity of at least one olfactory receptor selected from the group consisting of: a DMTS olfactory receptor, an indole/skatole olfactory receptor, a butyric acid olfactory receptor, and a p-cresol olfactory receptor include the compounds disclosed in International Patent Application Publication No. WO2018/091686 A1.

In one aspect, an at least one compound capable of inhibiting the activity of a DMTS olfactory receptor may be selected from the compounds capable of inhibiting the activity of a DMTS olfactory receptor disclosed in International Patent Application Publication No. WO2019/101821 A1.

In one aspect, an at least one compound capable of inhibiting the activity of a butyric acid olfactory receptor may be selected from the compounds capable of inhibiting the activity of a butyric acid olfactory receptor disclosed in International Patent Application Publication No. WO2019/101821 A1.

In one aspect, an at least one compound capable of inhibiting the activity of an indole/skatole olfactory receptor may be selected from the compounds capable of inhibiting the activity of an indole/skatole olfactory receptor disclosed in International Patent Application Publication No. WO2019/101821 A1.

In one aspect, an at least one compound capable of inhibiting the activity of a p-cresol olfactory receptor may be selected from the compounds capable of inhibiting the activity of a p-cresol olfactory receptor disclosed in International Patent Application Publication No. WO2018/091686 A1.

In one aspect, the malodour antagonist system is present in the malodour counteracting composition in an amount from 30 to 50% wt %, relative to the malodour counteracting composition.

In one aspect, the malodour antagonist system is present in the malodour counteracting composition in an amount from 30 to 45, or alternatively, in an amount from 30 to 40, or alternatively, in an amount from 30 to 35 wt %, relative to the malodour counteracting composition.

In one aspect, the malodour antagonist system is present in the malodour counteracting composition in an amount from 35 to 50, or alternatively, from 40 to 50, or alternatively, from 45 to 50 wt %, relative to the malodour counteracting composition.

In one aspect, the malodour antagonist system is present in the malodour counteracting composition at 30, or 35, or 40, or 45, or 50 wt %, relative to the malodour counteracting composition.

The at least one malodour neutralizing system: Without intending to be limited to any particular theory, the at least one malodour neutralizing system limits, decreases or eliminates the perception of a raw material malodour of a soap base by reacting various chemical compounds, such as dimethyl trisulfide (DMTS), butyric acid, indole, and p-cresol, which may be responsible for the perceived raw material malodours. The reactions result in reduction of the malodour materials' airborne levels and consequent reduction in the perception of the malodour.

In one aspect, the at least one malodour neutralizing system is present in the malodour counteracting composition in an amount from 5 to 20% wt %, relative to the malodour counteracting composition.

In one aspect, the at least one malodour neutralizing system is present in the malodour counteracting composition in an amount from 5 to 19, or alternatively, in an amount from 5 to 18, or alternatively, in an amount from 5 to 17, or alternatively, in an amount from 5 to 16, or alternatively, in an amount from 5 to 15, or alternatively, in an amount from 5 to 14, or alternatively, in an amount from 5 to 13, or alternatively, in an amount from 5 to 12, or alternatively, in an amount from 5 to 11, or alternatively, in an amount from 5 to 10, or alternatively, in an amount from 5 to 9, or alternatively, in an amount from 5 to 8, or alternatively, in an amount from 5 to 7, or alternatively, in an amount from 5 to 6 wt %, relative to the malodour counteracting composition.

In one aspect, the at least one malodour neutralizing system is present in the malodour counteracting composition in an amount from 6 to 20, or alternatively, in an amount from 7 to 20, or alternatively, in an amount from 8 to 20, or alternatively, in an amount from 9 to 20, or alternatively, in an amount from 10 to 20, or alternatively, in an amount from 11 to 20, or alternatively, in an amount from 12 to 20, or alternatively, in an amount from 13 to 20, or alternatively, in an amount from 14 to 20, or alternatively, in an amount from 15 to 20, or alternatively, in an amount from 16 to 20, or alternatively, in an amount from 17 to 20, or alternatively, in an amount from 18 to 20, or alternatively, in an amount from 19 to 20 wt %, relative to the malodour counteracting composition.

In one aspect, the at least one malodour neutralizing system is present in the malodour counteracting composition at 5, or 6, or 7, or 8, or 9, or 10, or 11, or 12, or 13, or 14, or 15, or 16, or 17, or 18, or 19, or 20 wt %, relative to the malodour counteracting composition.

In one aspect, the at least one malodour neutralizing system is selected from the group consisting of: a) a composition comprising at least one ingredient selected from the group consisting of: (i) at least one aldehyde of formula $R^1CHO$, wherein $R^1$ is an aliphatic linear or branched, saturated or unsaturated carbon chain containing from 1 to 12 carbon atoms; (ii) at least one ketone of formula $R^2COR^3$, wherein $R^2$ is an ethyl or methyl group and $R^3$ is an aliphatic linear or branched, saturated or unsaturated carbon chain containing from 1 to 12 carbon atoms; and (iii) primary alcohols of formula $R^4CH_2OH$, wherein $R^4$ is an aliphatic linear or branched, saturated or unsaturated carbon chain containing 1 to 12 carbon atoms, optionally substituted with an aromatic moiety; b) a composition comprising: (i) at least one ingredient selected from the group consisting of α-damascone, β-damascone, γ-damascone, δ-damascone, α-neobutenone, (+−)-methyl-2,2-dimethyl-6-methylene-1-cyclohexanecarboxylate, α- or β-(E)-4-(2,6,6-trimethyl-2-cyclohexen-1-yl)-3-buten-2-one (α- or (β-ionone), α-methyl-ionone, β-methyl-ionone, γ-methyl-ionone, 1-(2,6,6-trimethyl-1(2)-cyclohexen-1-yl)-1,6-heptadien-3-one and 1-(4,6,6-trimethyl-1,3-cyclohexadien-1-yl)-2-buten-1-one; and (ii) at least one nitrile ingredient selected from the group consisting of 3-phenyl-2-propenenitrile, citronitrile, citronellyl nitrile, 2-propyl-1-heptanenitrile, dodecanenitrile, and the mixture of 3-(2,3-dimethyl-2(3)-cyclopenten-1-yl)butanenitrile and 3-(2-methyl-3-methylene-1-cyclopentyl)butanenitrile; and c) a combination of a) and b).

Examples of compositions comprising at least one ingredient selected from the group consisting of: (i) at least one aldehyde of formula $R^1CHO$, wherein $R^1$ is an aliphatic linear or branched, saturated or unsaturated carbon chain containing from 1 to 12 carbon atoms; (ii) at least one ketone of formula $R^2COR^3$, wherein $R^2$ is an ethyl or methyl group and $R^3$ is an aliphatic linear or branched, saturated or unsaturated carbon chain containing from 1 to 12 carbon atoms; and (iii) primary alcohols of formula $R^4CH_2OH$, wherein $R^4$ is an aliphatic linear or branched, saturated or unsaturated carbon chain containing 1 to 12 carbon atoms, optionally substituted with an aromatic moiety may be found in U.S. Pat. No. 8,772,354.

Examples of compositions comprising at least one ingredient selected from the group consisting of (i) at least one ingredient selected from the group consisting of α-damascone, β-damascone, γ-damascone, δ-damascone, α-neobutenone, (+−)-methyl-2,2-dimethyl-6 -methylene-1-cyclohexanecarboxylate, α- or β-(E)-4-(2,6,6-trimethyl-2-cyclohexen-1-yl)-3-buten-2-one (α- or β-ionone), α-methyl-ionone, β-methyl-ionone, γ-methyl-ionone, 1-(2,6,6-trimethyl-1(2)-cyclohexen-1-yl)-1,6-heptadien-3-one and 1-(4,6,6-trimethyl-1,3 -cyclohexadien-1-yl)-2-buten-1-one; and (ii) at least one nitrile ingredient selected from the group consisting of 3-phenyl-2-propenenitrile, citronitrile, citronellyl nitrile, 2-propyl-1-heptanenitrile, dodecanenitrile, and the mixture of 3-(2,3-dimethyl-2(3)-cyclopenten-1-yl)butanenitrile and 3-(2-methyl-3-methylene-1-cyclopentyl)butanenitrile may be found in U.S. Patent Application Publication No. 2017/0266334 A1.

In some aspects, the malodour counteracting composition further comprises at least one perfuming raw material that limits, decreases or eliminates the perception of ammonia-based odourants.

In some aspects, at least one perfuming raw material that limits, decreases or eliminates the perception of ammonia-based odourants is present in the malodour counteracting composition in an amount from 0.01 to 20% wt %, relative to the malodour counteracting composition.

In some aspects, at least one perfuming raw material that limits, decreases or eliminates the perception of ammonia-based odourants is present in the malodour counteracting composition in an amount from 0.01 to 20%, or alternatively, from 0.01 to 10, or alternatively, from 0.01 to 9, or alternatively, from 0.01 to 8, or alternatively, from 0.01 to 7, or alternatively, from 0.01 to 6, or alternatively, from 0.01 to 5, or alternatively, from 0.01 to 4, or alternatively, from 0.01 to 3, or alternatively, from 0.01 to 2, or alternatively, from 0.01 to 1, or alternatively, from 0.01 to 0.5, or alternatively, from 0.01 to 0.4, or alternatively, from 0.01 to 0.3, or alternatively, from 0.01 to 0.2, or alternatively, from 0.01 to 0.1, or alternatively, from 0.01 to 0.09, or alternatively, from 0.01 to 0.08, or alternatively, from 0.01 to 0.07, or alternatively, from 0.01 to 0.06, or alternatively, from 0.01 to 0.05, or alternatively, from 0.01 to 0.04, or alternatively, from 0.01 to 0.03, or alternatively, from 0.01 to 0.02 wt %, relative to the malodour counteracting composition.

In some aspects, at least one perfuming raw material that limits, decreases or eliminates the perception of ammonia-based odourants is present in the malodour counteracting composition in an amount from 0.02 to 20, or alternatively, from 0.03 to 20, or alternatively, from 0.04 to 20, or alternatively, from 0.05 to 20, or alternatively, from 0.06 to 20, or alternatively, from 0.07 to 20, or alternatively, from 0.09 to 20, or alternatively, from 0.09 to 20, or alternatively, from 0.1 to 20, or alternatively, from 0.2 to 20, or alternatively, from 0.3 to 20, or alternatively, from 0.4 to 20, or alternatively, from 0.5 to 20, or alternatively, from 0.6 to 20, or alternatively, from 0.7 to 20, or alternatively, from 0.8 to 20, or alternatively, from 0.9 to 20, or alternatively, from 1 to 20, or alternatively, from 2 to 20, or alternatively, from 3 to 20, or alternatively, from 4 to 20, or alternatively, from 5 to 20, or alternatively, from 6 to 20, or alternatively, from 7 to 20, or alternatively, from 9 to 20, or alternatively, from 9 to 20, or alternatively, from 10 to 20, or alternatively, from 10 to 20 wt %, relative to the malodour counteracting composition.

In some aspects, at least one perfuming raw material that limits, decreases or eliminates the perception of ammonia-based odourants is present in the malodour counteracting composition at 0.01, or 0.02, or 0.03, or 0.04, or 0.05, or 0.06, or 0.07, or 0.08, or 0.09, or 0.1, or 0.2, or 0.3, or 0.4, or 0.5, or 0.6, or 0.7, or 0.8, or 0.9, or 1, or 2, or 3, or 4, or 5, or 6, or 7, or 8, or 9, or 10, or 20 wt %, relative to the malodour counteracting composition.

In some aspects, at least one perfuming raw material that limits, decreases or eliminates the perception of ammonia-based odourants is selected from the group consisting of: benzyl acetate, terpinyl acetate, acetophenone, undec-10-enal, hendecanal, undec-9-enal, methyl anthranilate, (5R)-2-methyl-5-prop-1-en-2-ylcyclohex-2-en-1-one, Virginia cedarwood essential oil, 1,5,5,9-tetramethyl-13-oxatricyclo (8.3.0.0.(4.9))tridecane, 3,7-dimethyl-2,6-octadienal, 3,7-Dimethyl-6-octen-1-ol, 3,7-dimethyloct-6-enenitrile, 3a,4,5,6,7,7a-hexahydro-4,7-methanoinden-6-yl acetate, delta damascone, diphenyloxide, ethyl vanillin, clove leaf essential oil, methyl ionone gamma, (Z)-3,4,5,6,6-pentamethylhept-3-en-2-one, 2,6-dimethylhept-5-enal, menthone, patchouli essential oil, pipol, TBCH, (2-tert-butylcyclohexyl) acetate, methyl cedryl ketone, 2-Methoxynaphthalene, and cineole.

In some aspects, the malodour counteracting composition further comprises at least one ingredient selected from the group consisting of a perfumery carrier and a perfumery base; and optionally at least one perfumery adjuvant.

As used herein, the term "perfumery carrier" refers to a material which is practically neutral from a perfumery point of view, i.e. which does not significantly alter the organoleptic properties of perfuming ingredients. The perfumery carrier may be a liquid or a solid.

Non-limiting examples of liquid perfumery carriers include an emulsifying system, i.e. a solvent and a surfactant system, or a solvent commonly used in perfumery. A detailed description of the nature and type of solvents commonly used in perfumery cannot be exhaustive. However, non-limiting examples solvents include dipropyleneglycol, diethyl phthalate, isopropyl myristate, benzyl benzoate, 2-(2-ethoxyethoxy)-1-ethanol or ethyl citrate. For the compositions which comprise both a perfumery carrier and a perfumery base, other suitable perfumery carriers than those previously specified, can be also ethanol, water/ethanol mixtures, limonene or other terpenes, isoparaffins such as those known under the trademark Isopar® (origin: Exxon Chemical) or glycol ethers and glycol ether esters such as those known under the trademark Dowanol® (origin: Dow Chemical Company).

Non-limiting examples of solid perfumery carriers include absorbing gums or polymers, or yet encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloide: Stabilisatoren, Dickungs- and Geliermittel in Lebensmitteln, Band 2 der Schriftenreihe Lebensmittelchemie, Lebensmittelqualität, Behr's Verlag GmbH & Co., Hamburg, 1996. The encapsulation is a well-known process to a person skilled in the art, and may be performed, for instance, using techniques such as spray-drying, agglomeration or yet extrusion; or consists of a coating encapsulation, including coacervation and complex coacervation technique.

As used herein, the term "perfumery base" refers a composition comprising at least one perfuming co-ingredient. A perfuming co-ingredient does not include the at least one compound. As used herein, the term "perfuming co-ingredient" refers to compound, which is used in a perfuming preparation or a composition to impart a hedonic effect. In other words such a co-ingredient, to be considered as being a perfuming one, must be recognized by a person skilled in the art as being able to impart or modify in a positive or pleasant way the odour of a composition, and not just as having an odour.

The nature and type of the perfuming co-ingredients present in the base do not warrant a more detailed description here, which in any case would not be exhaustive, the skilled person being able to select them on the basis of his general knowledge and according to intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and the perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that the co-ingredients may also be compounds known to release in a controlled manner various types of perfuming compounds.

As used herein, the term "perfumery adjuvant" refers to an ingredient capable of imparting additional added benefit such as a color, a particular light resistance, chemical stability, etc. A detailed description of the nature and type of adjuvant commonly used in perfuming bases cannot be exhaustive, but it has to be mentioned that the ingredients are well known to a person skilled in the art.

As used herein, the term perfume or perfume oil or perfume accord are used to designate a mixture of perfuming ingredients.

In some aspects, the present disclosure provides a perfuming composition comprising a malodour counteracting composition according to an aspect presented herein.

In some aspects, the present disclosure provides a soap comprising a malodour counteracting composition according to an aspect presented herein.

The present invention is best illustrated but is not limited to the following examples.

EXAMPLES

Example 1: Characterization of Raw Material Malodours in Representative Laundry Soap Bases The raw material malodours present in seven representative laundry soap bases were identified and characterized using a behavioral sensory evaluation approach known as the Quantitative Descriptive Analysis (QDA), developed by Tragon Corporation in 1974. QDA uses descriptive panels to measure a product's sensory characteristics. Panel members use their senses to identify perceived similarities and differences in products, and articulate those perceptions in their own words.

During language development sessions, panelists received the products to describe them. All terms generated were then evaluated on a 6-point nonlinear scale from 0 (not perceived odour) to 5 (strong odour). To reduce the attributes list, the Dravniek means were calculated and multi-dimensional and variance analyses were run. 16 sensory terms were identified to describe the raw material malodours present in seven representative laundry soap bases (assessed neat), which were: tiare, synthetic, milky, waxy, burnt oil, metallic, oily, fried oil, roasted, chalky, plastic, rubber, starchy, engine oil, and chemical. Each representative laundry soap base was evaluated three times.

FIGS. 1 through 7 show the sensory profile of seven representative laundry soap bases. The results are summarized in the table below:

| Laundry Soap Base Number | Sensory Terms Attributed by QDA |
|---|---|
| 1 | Synthetic, waxy, oily and plastic/rubber |
| 2 | Waxy, oily, metallic and burnt oil |
| 3 | Waxy, plastic/rubber and ash |
| 4 | Waxy and plastic/rubber |
| 5 | Waxy, plastic/rubber, roasted and chalky |
| 6 | Synthetic, waxy, plastic/rubber and rancid |
| 7 | Synthetic, waxy and tiare |

Laundry soap base 1 was described by the panelists as mainly synthetic, waxy, fatty, ash, roasted, chalky and metallic. Laundry soap base 2 was described by the panelists as mainly waxy, fatty, metallic, engine oil and roasted. Laundry soap base 3 was described by the panelists as mainly ash, waxy, starchy and plastic/rubber. Laundry soap base 4 was described by the panelists as mainly plastic/rubber, waxy, synthetic and oily. Laundry soap base 5 was described by the panelists as mainly waxy, plastic/rubber, chalky, roasted, and synthetic. Laundry soap base 6 was described by the panelists as mainly waxy, plastic/rubber, synthetic and rancid. Laundry soap base 7 was described by the panelists as mainly tiare, synthetic, waxy and milky.

Based on this sensory information, a malodour counteracting composition can be designed, incorporating:

(i) a malodour antagonist system, to limit, decrease or eliminate the perception of the raw material malodour of the soap base arising from activation of at least one olfactory receptor selected from the group consisting of: a DMTS olfactory receptor, an indole/skatole olfactory receptor, a butyric acid olfactory receptor, and a p-cresol olfactory receptor;

(ii) at least one malodour neutralizing system, that react with, and remove sulfur-ased, amine-based, acid-based odourants; and (iii) perfuming raw materials that react with, and remove ammonia-based odourants.

Figure 8:
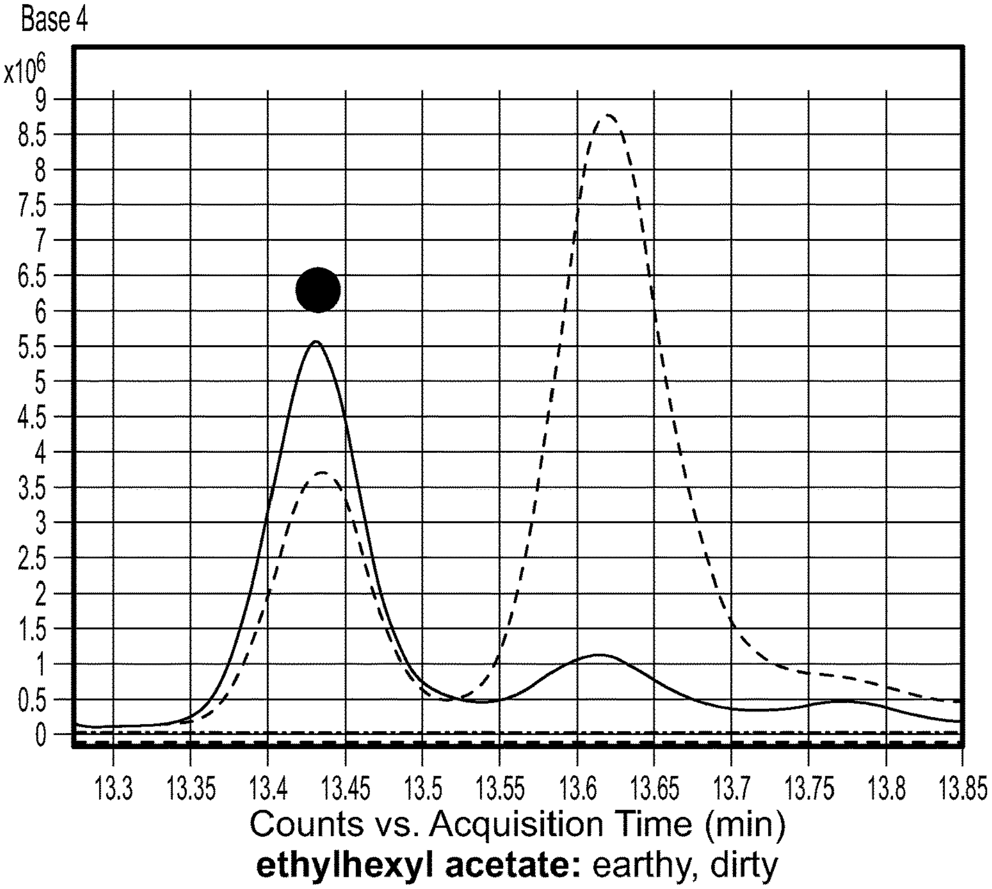
FIG. 8 shows the ability of the malodour counteracting composition described in Example 2, to decrease the headspace concentration of certain malodour causing molecules. TOP LEFT: The ability of the malodour counteracting composition described in Example 2, added at a final concentration of 0.05% to representative laundry soap base 4 to decrease the headspace concentration of ethylhexyl acetate (red line), compared to the headspace concentration of ethylhexyl acetate of representative laundry soap base 4 alone (blue line). TOP RIGHT: The ability of the malodour counteracting composition described in Example 2, added at a final concentration of 0.05% to representative laundry soap base 4 to decrease the headspace concentration of 2-undecanone (red line), compared to the headspace concentration of 2-undecanone of representative laundry soap base 4 alone (blue line). LOWER LEFT: The ability of the malodour counteracting composition described in Example 2, added at a final concentration of (i) 0.08% (blue line), (ii) 0.05% (green line) to representative laundry soap base 3 to decrease the headspace concentration of 2-undecanone, compared to the headspace concentration of 2-undecanone of representative laundry soap base 3 alone (red line). LOWER RIGHT: The ability of the malodour counteracting composition described in Example 2, added at a final concentration of (i) 0.08% (blue line), (ii) 0.05% (green line) to representative laundry soap base 3 to decrease the headspace concentration of ethylhexyl acetate, compared to the headspace concentration of ethylhexyl acetate of representative laundry soap base 3 alone (red line).
Figure 8:
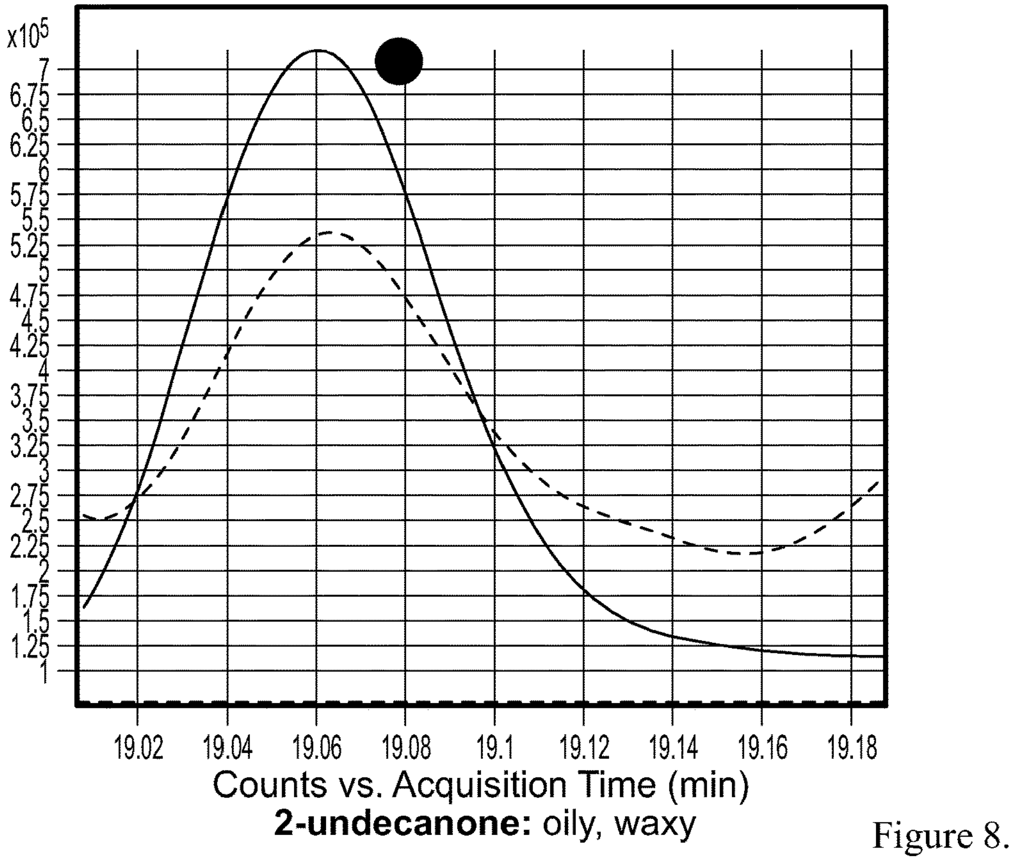
Figure 8:
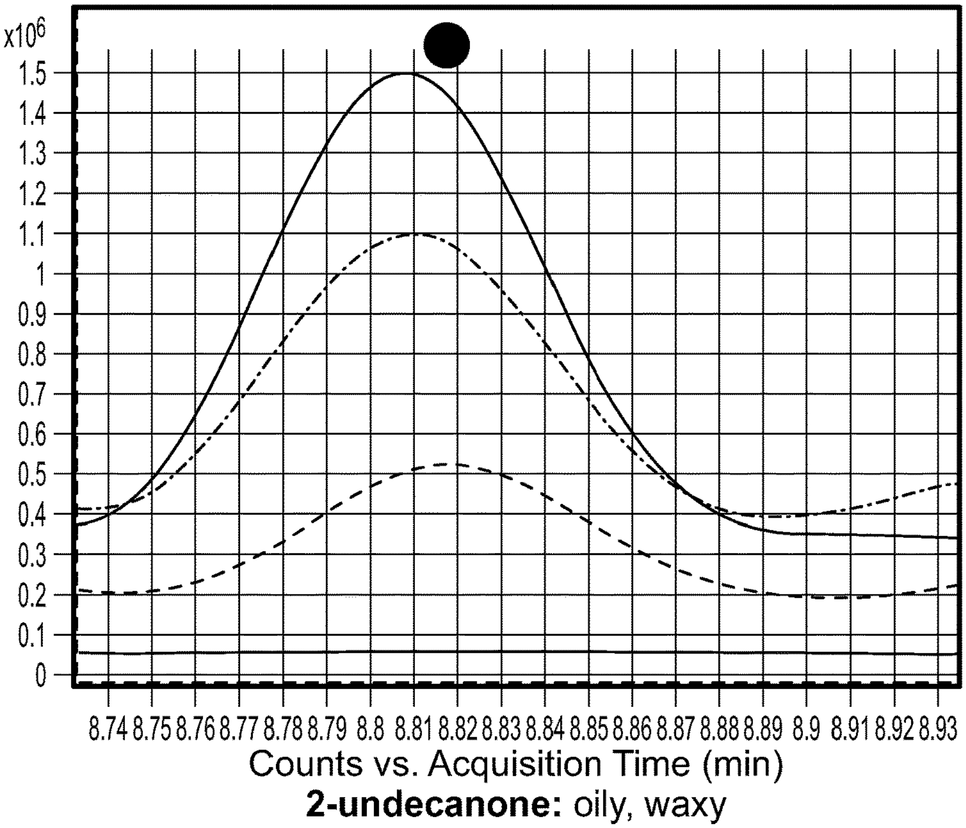
Figure 8:
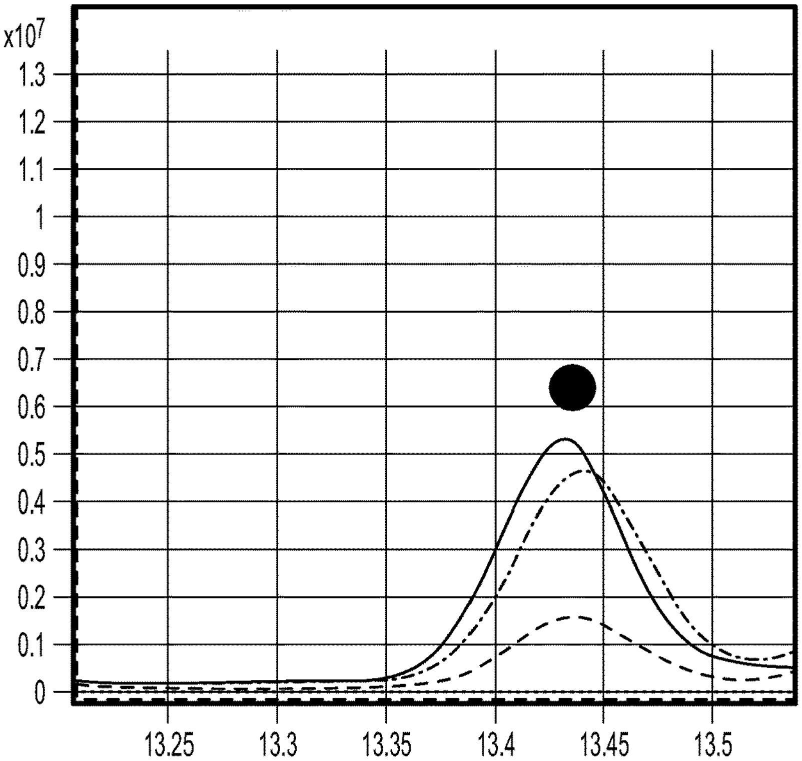

Example 2: Characterization of the Malodour Antagonist System According to Aspects Presented Herein The sensory terms attributed to the representative laundry soap bases identified and described in Example 1 above are the result of certain malodour molecules being present in the headspace surrounding the laundry soap base. FIG. 8 reports the ability of the malodour counteracting composition described below, to decrease the headspace concentration of ethylhexyl acetate (earthy, dirty olfactive notes), and 2-undecanone (oily, waxy olfactive notes).

| IUPAC name | Amount (% wt) | Trivial name |
|---|---|---|
| Propan-2-yl tetradecanoate | 22% | |
| 1-(2,6,6-trimethyl-1-cyclohex-2-enyl)pent-1-en-3-one N- | 15% | |
| 3a,4,5,6,7,7a-hexahydro-4,7-methanoinden-6-yl acetate | 10% | |
| (±)-3,7-Dimethyl-1,6-octadien-3-ol | 6% | |
| 2,6-dimethyloct-7-en-2-ol | 4% | |
| others | 43% | |

Example 3: Consumer Testing of Laundry Soaps Treated According to Methods Disclosed Herein The ability of the malodour counteracting composition described herein to limit, decrease or eliminate the perception of the raw material malodour of a commercially available laundry soap base was tested, using consumers in Nigeria (skin cleansing base) and the Ivory Coast (laundry base). The ability of the malodour counteracting composition to limit, decrease or eliminate the perception of the raw material malodour was evaluated in the dry soap powder in the box (neat), and evaluated using a wet towel soaking in a solution of the laundry powder for 10 minutes, prior to evaluation (wet, to simulate the product being used).

In the first study, conducted in the Ivory Coast, consumers were asked to evaluate a benckmark base, lacking any perfuming composition (CDI Base), a benchmark base, containing 0.35 wt % aloe chamomile fragrance (CDI Base Aloe Chamomile 0.35%), and a benchmark base, containing 0.31 wt % optima fragrance (CDI Base Optima 0.31%), and were asked to compare the benchmark bases to a test base lacking any perfuming composition (GH base), a test base containing 0.02% of the malodour counteracting composition (GH Base+NM 0.02%), a test base containing 0.35 wt % aloe chamomile fragrance (GH base Aloe Chamomile 0.35%), a test base containing 0.35 wt % aloe chamomile fragrance and 0.02% of the malodour counteracting composition (GH base Aloe Chamomile 0.35%+NM 0.02%), a test base containing 0.31 wt % aloe chamomile fragrance and 0.02% of the malodour counteracting composition (GH base Aloe Chamomile 0.31%+NM 0.02%), a test base containing 0.31 wt % Optima fragrance (GH base Optima 0.31%), a test base containing 0.31 wt % Optima fragrance and 0.02% of the malodour counteracting composition (GH base Optima 0.31%+NM 0.02%), and a test base containing 0.31 wt % Optima fragrance (GH base Optima 0.31%), a test base containing 0.28 wt % Optima fragrance and 0.02% of the malodour counteracting composition (GH base Optima 0.28%+NM 0.02%).

Figure 9:
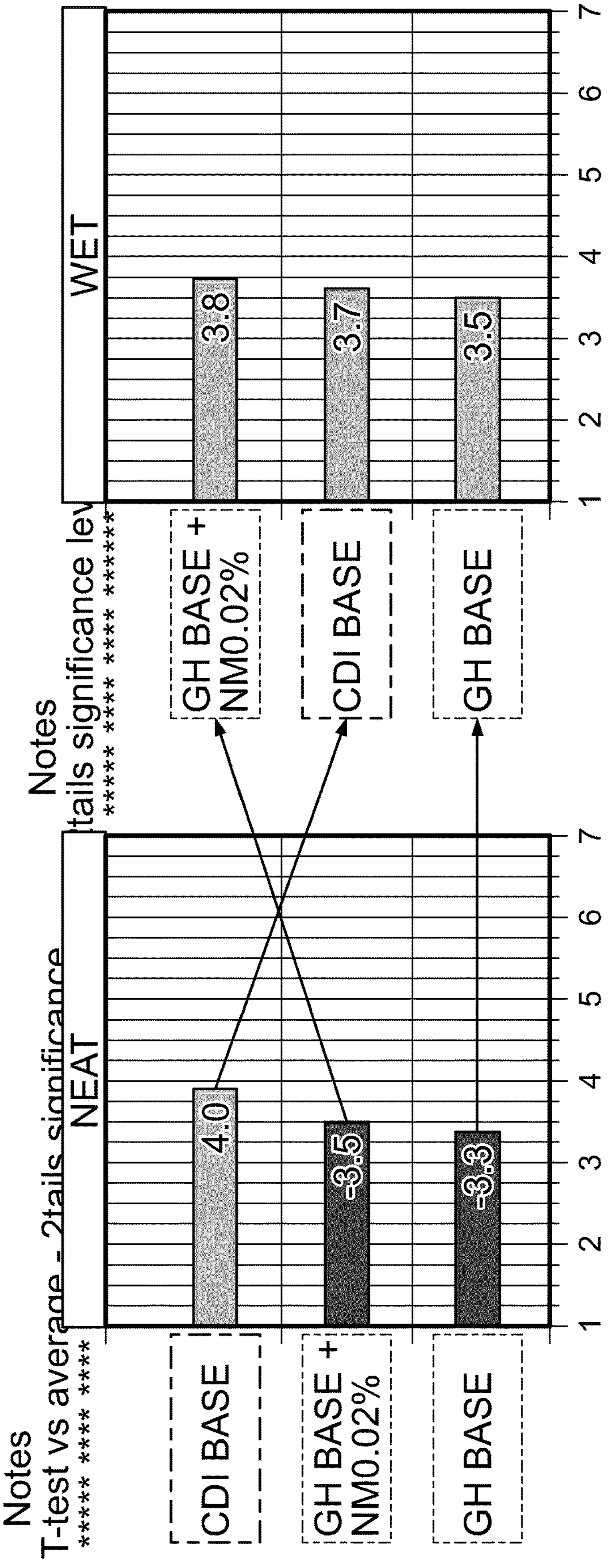
FIG. 9 shows the overall fragrance liking of the test bases described in the first study set forth in Example 3, compared to the unfragranced benchmark base.

FIG. 9 shows the overall fragrance liking of the test bases, compared to the unfragranced benchmark base (CDI Base). These data suggest that the malodour counteracting composition performed slightly better wet than neat, and the likability of the test base with the malodour counteracting composition was at parity with the benchmark base.

Figure 10:
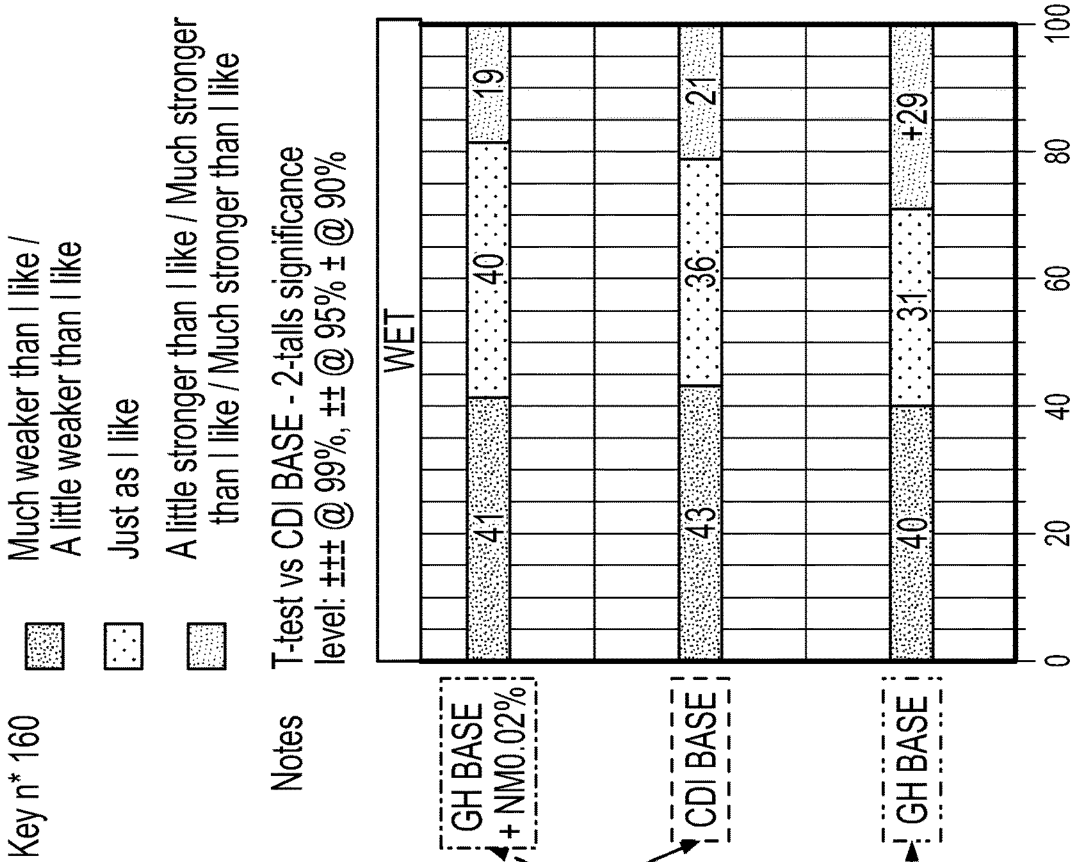
FIG. 10 shows the overall fragrance strength of the test bases described in the first study set forth in Example 3, compared to the unfragranced benchmark base.

FIG. 10 shows the overall fragrance strength of the test bases, compared to the unfragranced benchmark base. These data suggest that the malodour counteracting composition is at parity with the unfragranced benchmark base, both wet and dry. However, when evaluated wet, the test base containing 0.02% of the malodour counteracting composition was able to improve the JAR marginally, compared to the unfragranced benchmark base.

The test subjects reported similar performance scores for the test base containing 0.31 wt % aloe chamomile fragrance and 0.02% of the malodour counteracting composition (GH base Aloe Chamomile 0.31%+NM 0.02%), compared to the test base containing 0.35 wt % aloe chamomile fragrance (GH base Aloe Chamomile 0.35%) and the test base containing 0.35 wt % aloe chamomile fragrance and 0.02% of the malodour counteracting composition (GH base Aloe Chamomile 0.35%+NM 0.02%). Similarly, the test subjects reported similar performance scores for the test base containing test base containing 0.28 wt % Optima fragrance and 0.02% of the malodour counteracting composition (GH base Optima 0.28%+NM 0.02%), compared to the test base containing 0.31 wt % Optima fragrance (GH base Optima 0.31%), or the test base containing 0.31 wt % Optima fragrance and 0.02% of the malodour counteracting composition (GH base Optima 0.31%+NM 0.02%). Taken together, these data suggest that treatment of a soap base with a malodour counteracting composition is able to reduce the amount of a fragrance composition effective to limit, decrease or eliminate the perception of the raw material malodour of a soap base.

In the second study, conducted in Nigeria, consumers were asked to evaluate a benckmark base, lacking any perfuming composition (Unfragranced Base), a benchmark base, containing 1.18 wt % Brahmana fragrance (Brahmana 1.18%), and a benchmark base, containing 0.56 wt % Citras fragrance (Citras 0.56%), and were asked to compare the benchmark bases to a test base lacking any perfuming composition, but containing 0.02% of the malodour counteracting composition (Base+NM 0.02%), a test base containing 1.18 wt % Brahmana fragrance and 0.02% of the malodour counteracting composition (Brahmana 1.18%+NM 0.02%), a test base containing 1.14 wt % Brahmana fragrance and 0.02% of the malodour counteracting composition (Brahmana 1.14%+NM 0.02%), a test base containing 1.03 wt % Brahmana fragrance and 0.02% of the malodour counteracting composition (Brahmana 1.03%+NM 0.02%), a test base containing 0.56 wt % Citras fragrance and 0.02% of the malodour counteracting composition (Citras 0.56%+NM 0.02%), a test base containing 0.54 wt % Citras fragrance and 0.02% of the malodour counteracting composition (Citras 0.54%+NM 0.02%), and a test base containing 0.49 wt % Citras fragrance and 0.02% of the malodour counteracting composition (Citras 0.49%+NM 0.02%).

Figure 11:
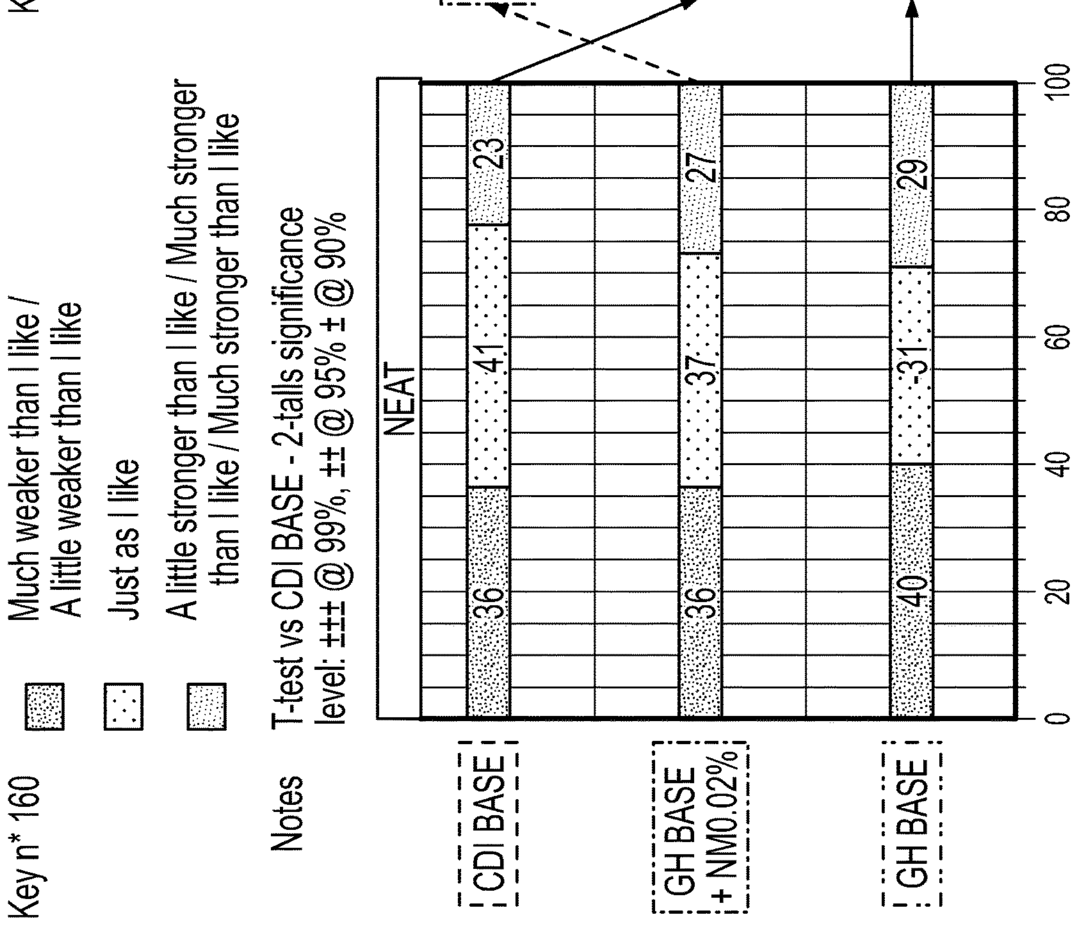
FIG. 11 shows the overall fragrance liking of the neat test bases described in the second study set forth in Example 3, compared to the unfragranced benchmark base.
Figure 12:
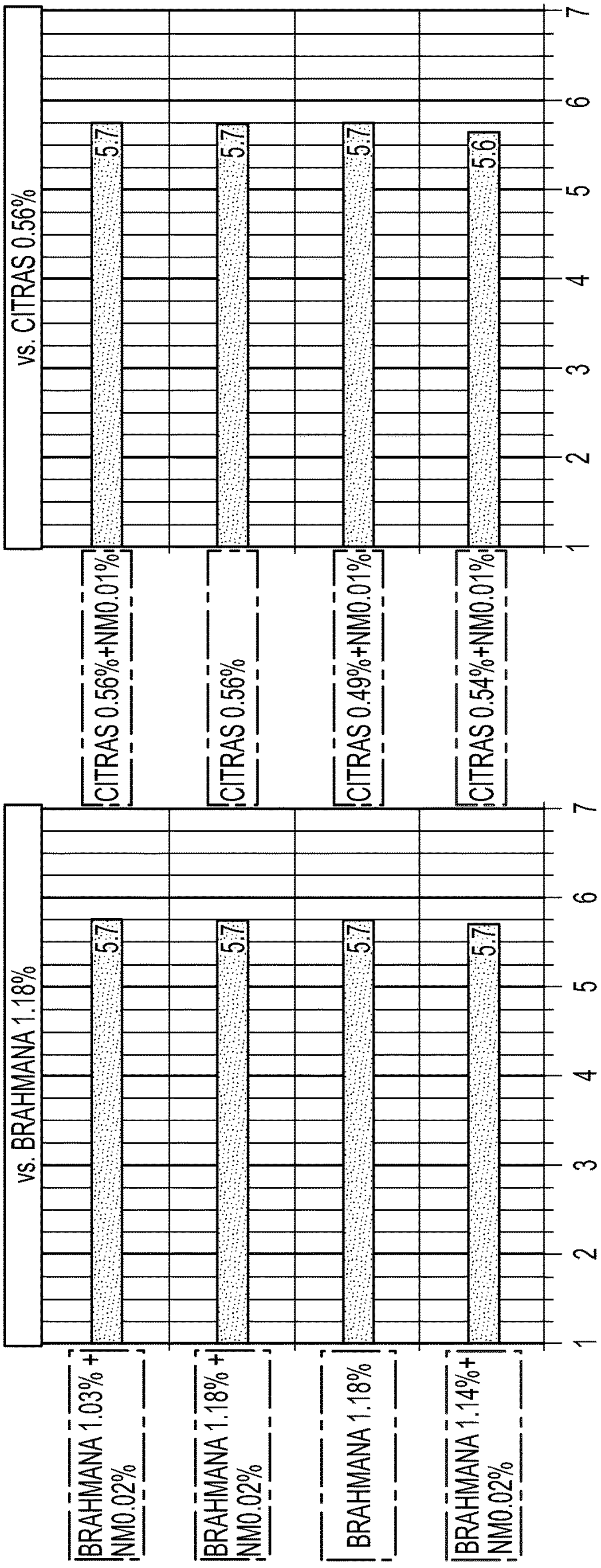
FIG. 12 shows the overall fragrance liking of the wet test bases described in the second study set forth in Example 3, compared to the unfragranced benchmark base.
Figure 13:
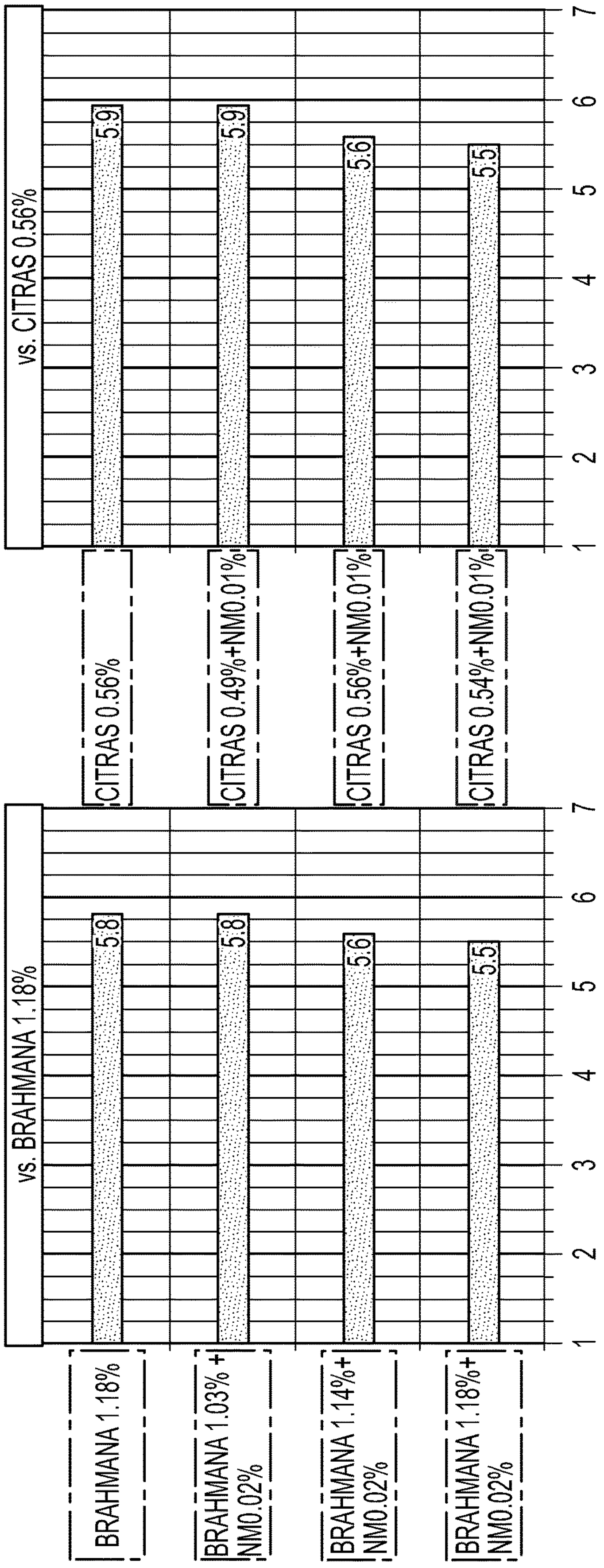
FIG. 13 shows the overall fragrance liking of the dry test bases described in the second study set forth in Example 3, compared to the unfragranced benchmark base.
Figure 13:
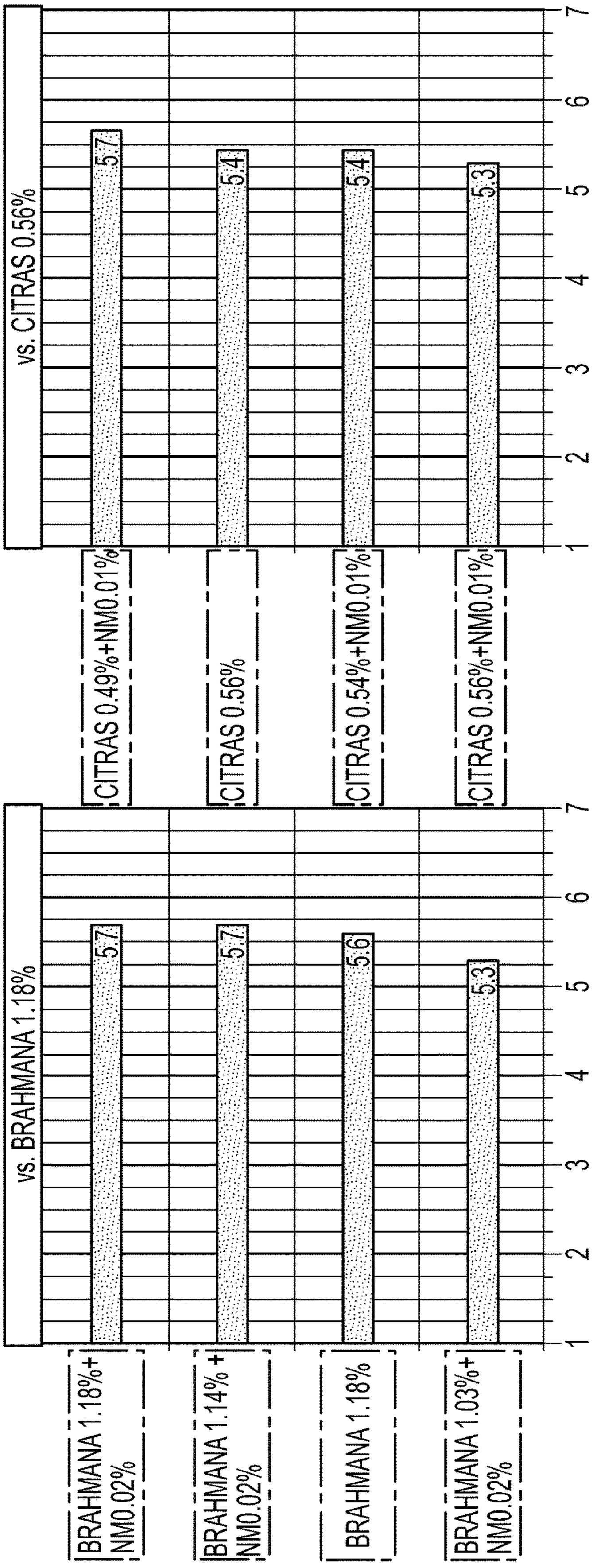

FIG. 11 shows the overall fragrance liking of the neat test bases, compared to the unfragranced benchmark base (Unfragranced Base). FIG. 12 shows the overall fragrance liking of the wet test bases, compared to the unfragranced benchmark base (Unfragranced Base). FIG. 13 shows the overall fragrance liking of the dry test bases, compared to the unfragranced benchmark base (Unfragranced Base).

Figure 14:
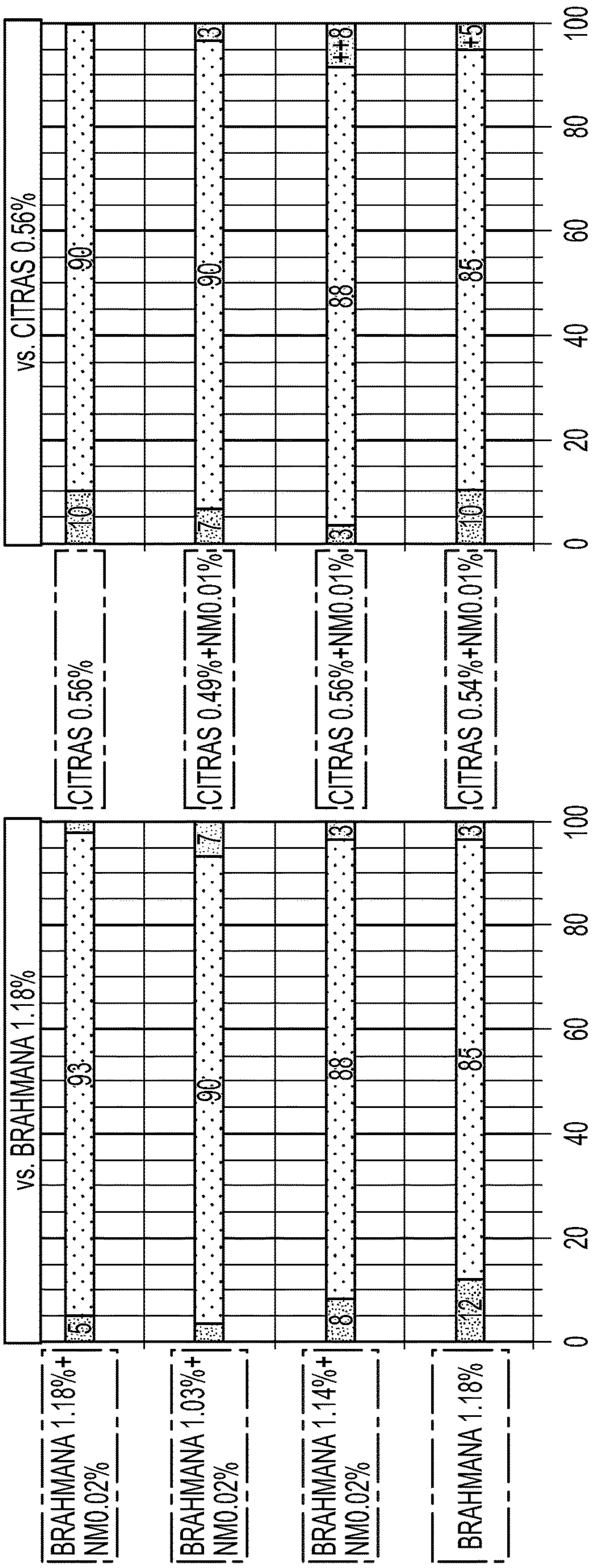
FIG. 14 shows the overall fragrance strength of the neat test bases described in the second study set forth in Example 3, compared to the unfragranced benchmark base.
Figure 15:
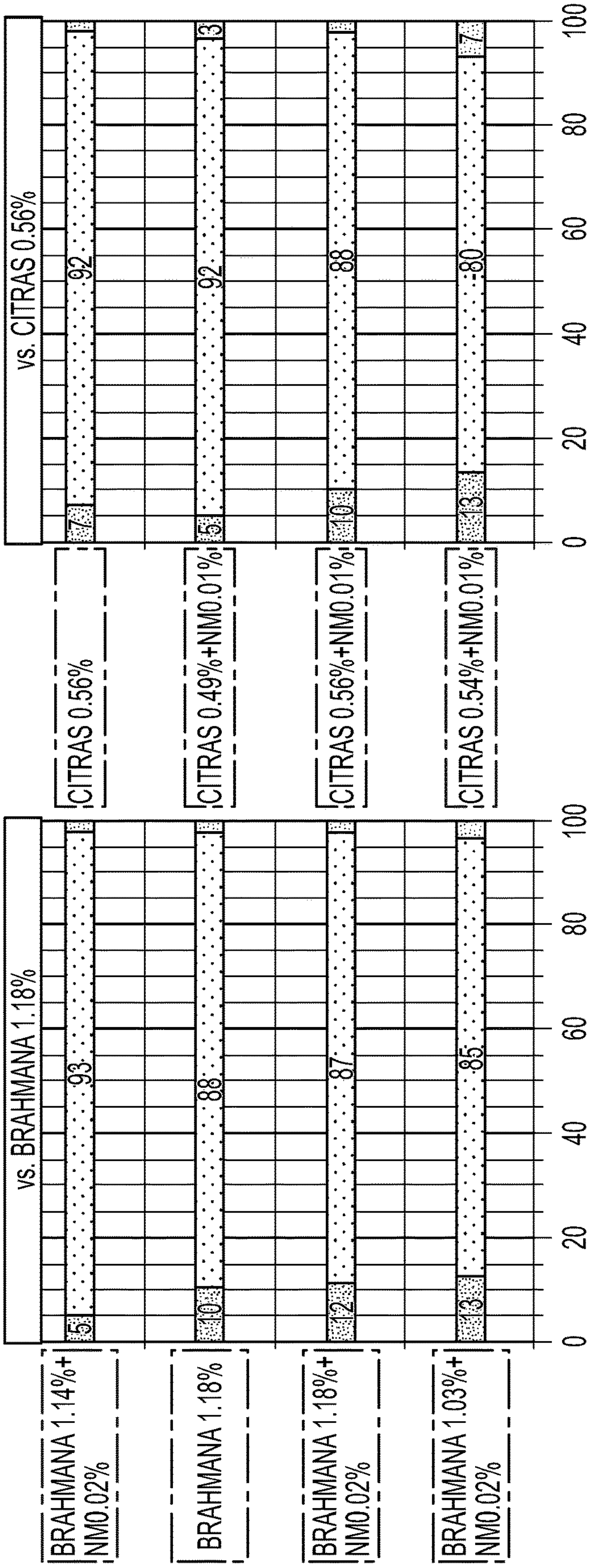
FIG. 15 shows the overall fragrance strength of the wet test bases described in the second study set forth in Example 3, compared to the unfragranced benchmark base.
Figure 16:
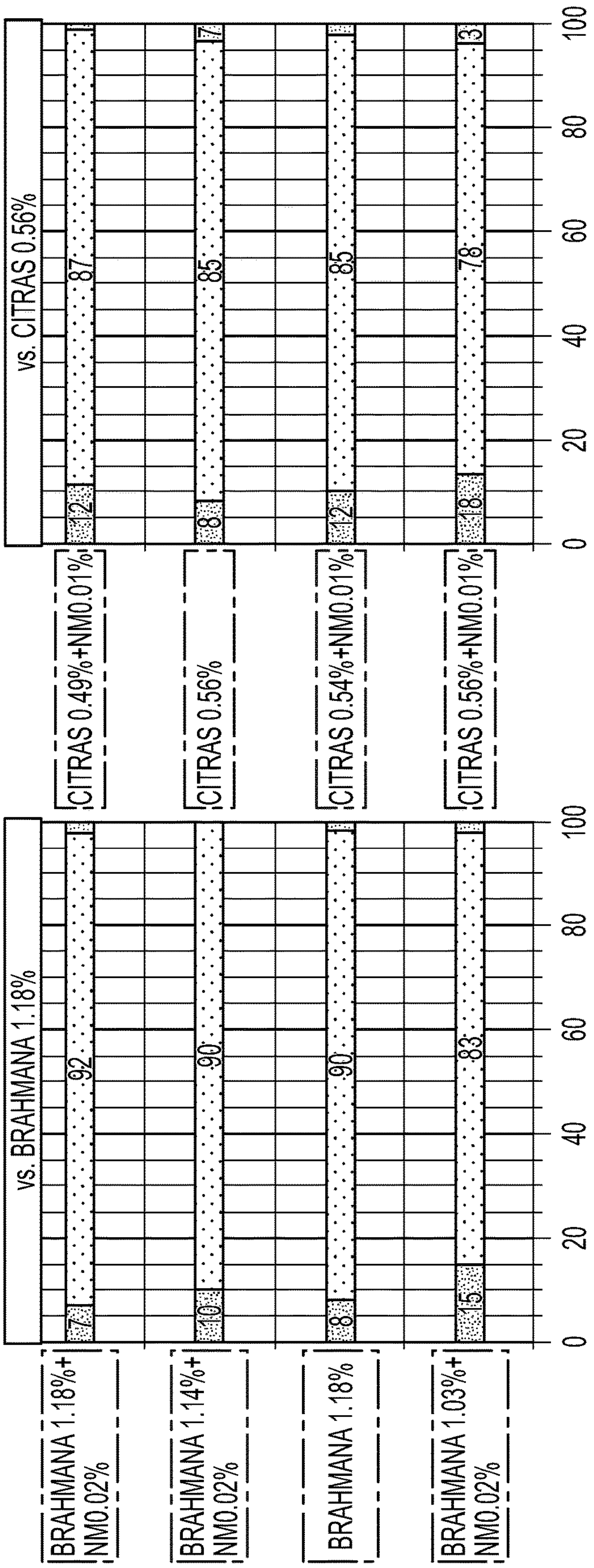
FIG. 16 shows the overall fragrance strength of the dry test bases described in the second study set forth in Example 3, compared to the unfragranced benchmark base.

FIG. 14 shows the overall fragrance liking of the neat test bases, compared to the unfragranced benchmark base (Unfragranced Base). FIG. 15 shows the overall fragrance liking of the wet test bases, compared to the unfragranced benchmark base (Unfragranced Base). FIG. 16 shows the overall fragrance liking of the dry test bases, compared to the unfragranced benchmark base (Unfragranced Base).

Taken together, these data suggest that at lower amounts of fragrance oil, the presence of the malodour counteracting composition generated similar liking scores to the higher concentrations of perfume oil, lacking the malodour counteracting composition.

When assessing fragrance benefits, referring to FIG. 17, with respect to the neat results, different combinations of fragrance & NM achieve parity scores vs. the fragrance-only formats (BRAHMANA 1.18% & CITRAS 0.56%). The low cost combination "BRAHMANA 1.03%+NM 0.02%" seems to lift the benefit scores slightly above those of the UNFRAGRANCED BASE, unlike its similar CITRAS combination "CITRAS 0.49%+NM 0.01%" (records slightly lower for most attributes vs. CITRAS 0.56%).

Referring to FIG. 18, in wet, parity is also the dominant aspect of the fragrance & NM combinations vs. the fragrance-only formats across all benefits. Both low cost combination "BRAHMANA 1.03%+NM 0.02%" & "CITRAS 0.49%+NM 0.01%" record very close scores to those of BRAHMANA 1.18% & CITRAS 0.56% respectively.

Referring to FIG. 19, results in dry are similar to those of wet with all fragrance & NM combinations scoring at parity with the fragrance-only formats across all benefits. It is noted that the scores of low cost combination "BRAHMANA 1.03%+NM 0.02%" drop in this stage vs. the UNFRAGRANCED BASE, while an opposite trend is spotted for "CITRAS 0.49%+NM 0.01%" whose scores marginally improve vs. the UNFRAGRANCED BASE in this stage.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

The invention claimed is:

1. A method of reducing a perception of raw material malodor in a soap base, the method comprising adding to the soap base a malodor counteracting composition, wherein the malodor counteracting composition comprises (i) a malodor antagonist composition, which comprises at least one compound that inhibits the activity of at least one olfactory receptor selected from the group consisting of: a DMTS olfactory receptor, an indole/skatole olfactory receptor, a butyric acid olfactory receptor, and a p-cresol olfactory receptor, and (ii) a malodor neutralizing composition, wherein the malodor counteracting composition is added to the soap base at a concentration ranging from 0.005 to 0.1 wt %, relative to the weight of soap base, and wherein the malodor neutralizing composition comprises:

(a) at least one ingredient selected from the group consisting of: (i) at least one aldehyde of formula $R^1CHO$, wherein $R^1$ is an aliphatic linear or branched, saturated or unsaturated carbon chain containing from 1 to 12 carbon atoms; (ii) at least one ketone of formula $R^2COR^3$, wherein $R^2$ is an ethyl or methyl group and $R^3$ is an aliphatic linear or branched, saturated or unsaturated carbon chain containing from 1 to 12 carbon atoms; and (iii) at least one primary alcohol of formula $R^4CH^2OH$, wherein $R^4$ is an aliphatic linear or branched, saturated or unsaturated carbon chain containing 1 to 12 carbon atoms, optionally substituted with an aromatic moiety;

(b) at least one ingredient selected from the group consisting of α-damascone, β-damascone, γ-damascone, δ-damascone, α-neobutenone, (+)-methyl-2,2-dimethyl-6-methylene-1-cyclohexanecarboxylate, α- or β-(E)-4-(2,6,6-trimethyl-2-cyclohexen-1-yl}-3-buten-2-one (α- or β-ionone), α-methyl-ionone, β-methyl-ionone, γ-methyl-ionone, 1-(2,6,6-trimethyl-1 (2)-cyclohexen-1-yl)-1,6-heptadien-3-one and 1-(4,6,6-trimethyl-1,3-cyclohexadien-1-yl}-2-buten-1-one; and (c) at least one nitrile ingredient selected from the group consisting of 3-phenyl-2-propenenitrile, citronitrile, citronellyl nitrile, 2-propyl-1-heptanenitrile, dodecanenitrile, and the mixture of 3-(2,3-dimethyl-2 (3)-cyclopenten-1-yl) butanenitrile and 3-(2-methyl-3-methylene-1-cyclopentyl) butanenitrile;

wherein the malodor antagonist composition is present in the malodor counteracting composition in an amount from 30 to 50 wt %, relative to the malodor counteracting composition, and wherein the malodor neutralizing composition is present in the malodor counteracting composition in an amount from 5 to 20 wt %, relative to the malodor counteracting composition.

2. The method of claim 1, wherein the at least one compound that inhibits the activity of at least one olfactory receptor is selected from the group consisting of: benzyl acetate, isobornyl acetate, undec-10-enal, undec-9-enal, Virginia cedarwood essential oil, 3,7-dimethyl-2,6-octadienal, 7-dimethyl-6-octen-1-ol, 3,7-dimethyloct-6-enenitrile, coumarin, delta damascone, methyl ionone gamma, (Z)-3,4,5,6,6-pentamethylhept-3-en-2-one, 2,6-dimethylhept-5-enal, menthone, 1-(5,5-dimethyl-1-cyclohexenyl) pent-4-en-1-one, patchouli essential oil, 2,6-nonadienal, (2-tert-butylcyclohexyl) acetate, vertoxime, and 2-methoxynaphthalene.

* * * * *